US007873724B2

(12) United States Patent
Horvitz et al.

(10) Patent No.: US 7,873,724 B2
(45) Date of Patent: Jan. 18, 2011

(54) SYSTEMS AND METHODS FOR GUIDING ALLOCATION OF COMPUTATIONAL RESOURCES IN AUTOMATED PERCEPTUAL SYSTEMS

(75) Inventors: Eric J. Horvitz, Kirkland, WA (US); Nuria M. Oliver, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 2023 days.

(21) Appl. No.: 10/729,464

(22) Filed: Dec. 5, 2003

(65) Prior Publication Data
US 2005/0132378 A1    Jun. 16, 2005

(51) Int. Cl.
*G06F 15/18* (2006.01)
(52) U.S. Cl. .................. 709/224; 709/226; 706/14; 706/15
(58) Field of Classification Search ......... 709/226–228; 700/90, 241; 701/1; 704/249; 705/1; 707/1–10, 707/100–101; 713/100, 300; 715/738; 370/252, 370/352, 392; 379/219; 382/232; 398/30; 424/641; 435/6; 463/42; 706/14, 15
See application file for complete search history.

(56) References Cited

U.S. PATENT DOCUMENTS

| | | | | |
|---|---|---|---|---|
| 5,704,012 | A * | 12/1997 | Bigus ........................ | 706/19 |
| 6,216,956 | B1 * | 4/2001 | Ehlers et al. ................ | 236/47 |
| 6,321,206 | B1 * | 11/2001 | Honarvar .................... | 705/7 |
| 6,327,622 | B1 * | 12/2001 | Jindal et al. ................ | 709/228 |
| 6,333,979 | B1 * | 12/2001 | Bondi et al. ................ | 379/219 |
| 6,347,297 | B1 * | 2/2002 | Asghar et al. .............. | 704/243 |
| 6,353,398 | B1 | 3/2002 | Amin et al. | |
| 6,421,655 | B1 * | 7/2002 | Horvitz et al. ............. | 706/61 |
| 6,421,778 | B1 * | 7/2002 | Wood et al. ................ | 713/100 |
| 6,484,062 | B1 * | 11/2002 | Kim .......................... | 700/90 |
| 6,513,026 | B1 | 1/2003 | Horvitz et al. | |
| 6,553,403 | B1 | 4/2003 | Jarriel et al. | |

(Continued)

FOREIGN PATENT DOCUMENTS

WO    WO 01/52510 A1 *    7/2001

OTHER PUBLICATIONS

NPLNGD, by MathWorld Team of Wolfram Research, Inc Published on 1999.*

(Continued)

*Primary Examiner*—Kevin Bates
(74) *Attorney, Agent, or Firm*—Wolf, Greenfield & Sacks, P.C.

(57) ABSTRACT

The present invention leverages analysis methods, such as expected value of information techniques, rate-based techniques, and random selection technique, to provide a fusion of low-level streams of input data (e.g., raw data) from multiple sources to facilitate in inferring human-centric notions of context while reducing computational resource burdens. In one instance of the present invention, the method utilizes real-time computations of expected value of information in a greedy, one-step look ahead approach to compute a next best set of observations to make at each step, producing "EVI based-perception." By utilizing dynamically determined input data, the present invention provides utility-directed information gathering to enable a significant reduction in system resources. Thus, of the possible input combinations, the EVI-based system can automatically determine which sources are required for real-time computation relating to a particular context.

82 Claims, 11 Drawing Sheets

U.S. PATENT DOCUMENTS

| | | | |
|---|---|---|---|
| 6,584,489 B1 | 6/2003 | Jones et al. | |
| 6,591,010 B1 | 7/2003 | Russin | |
| 6,601,012 B1 | 7/2003 | Horvitz et al. | |
| 6,672,506 B2 | 1/2004 | Swartz et al. | |
| 6,697,802 B2 | 2/2004 | Ma et al. | |
| 6,741,188 B1 | 5/2004 | Miller et al. | |
| 6,747,675 B1* | 6/2004 | Abbott et al. | 715/740 |
| D494,584 S | 8/2004 | Schlieffers et al. | |
| 6,796,505 B2 | 9/2004 | Pellaumail et al. | |
| 6,837,436 B2 | 1/2005 | Swartz et al. | |
| 6,920,439 B1* | 7/2005 | Love | 706/20 |
| 6,938,021 B2* | 8/2005 | Shear et al. | 705/67 |
| 7,010,501 B1 | 3/2006 | Roslak et al. | |
| 7,040,541 B2 | 5/2006 | Swartz et al. | |
| 7,055,111 B2* | 5/2006 | Scheessele | 715/864 |
| 7,063,263 B2 | 6/2006 | Swartz et al. | |
| 7,136,844 B2* | 11/2006 | Wrobel et al. | 707/1 |
| 7,171,378 B2 | 1/2007 | Petrovich et al. | |
| 7,195,157 B2 | 3/2007 | Swartz et al. | |
| 7,280,988 B2* | 10/2007 | Helsper et al. | 706/26 |
| 7,327,954 B2* | 2/2008 | Palacharla et al. | 398/30 |
| 7,385,501 B2 | 6/2008 | Miller et al. | |
| 7,565,447 B2* | 7/2009 | Gellens et al. | 709/240 |
| 2001/0014356 A1 | 8/2001 | Yoshida et al. | 424/641 |
| 2001/0030664 A1 | 10/2001 | Shulman et al. | |
| 2002/0142843 A1* | 10/2002 | Roelofs | 463/42 |
| 2002/0169782 A1* | 11/2002 | Lehmann et al. | 707/100 |
| 2003/0112762 A1* | 6/2003 | Mahmoud et al. | 370/252 |
| 2004/0059466 A1* | 3/2004 | Block et al. | 700/241 |
| 2004/0163001 A1* | 8/2004 | Bodas | 713/300 |
| 2004/0175048 A1* | 9/2004 | Pearlman et al. | 382/232 |
| 2004/0177069 A1* | 9/2004 | Li et al. | 707/5 |
| 2004/0201500 A1 | 10/2004 | Miller et al. | |
| 2004/0249639 A1* | 12/2004 | Kammerer | 704/249 |
| 2004/0249650 A1* | 12/2004 | Freedman et al. | 705/1 |
| 2005/0071766 A1* | 3/2005 | Brill et al. | 715/738 |
| 2005/0113983 A1* | 5/2005 | Schubert | 701/1 |
| 2005/0266858 A1 | 12/2005 | Miller et al. | |
| 2005/0272442 A1 | 12/2005 | Miller et al. | |
| 2006/0019676 A1 | 1/2006 | Miller et al. | |
| 2006/0039364 A1* | 2/2006 | Wright | 370/352 |
| 2006/0106323 A1* | 5/2006 | Bischoff et al. | 600/515 |
| 2006/0129580 A1* | 6/2006 | Haft et al. | 707/101 |
| 2006/0258950 A1* | 11/2006 | Hargrove et al. | 600/544 |
| 2007/0286198 A1* | 12/2007 | Muirhead et al. | 370/392 |
| 2008/0052213 A1* | 2/2008 | Bell | 705/36 R |
| 2008/0076129 A1* | 3/2008 | Parl | 435/6 |
| 2008/0090591 A1 | 4/2008 | Miller et al. | |
| 2008/0091537 A1 | 4/2008 | Miller et al. | |
| 2008/0161018 A1 | 7/2008 | Miller et al. | |
| 2008/0162498 A1* | 7/2008 | Omoigui | 707/10 |
| 2008/0313194 A1* | 12/2008 | Shkedi | 707/10 |

OTHER PUBLICATIONS

C.G. Jung. Experimenting with Layered, Resource-Adapting Agents in the RoboCup Simulation. In Proc. of the 1998 RoboCup Workshop. 13 pages.

N. Oliver, E. Horvitz, and A. Garg. Hierarchical Representations for Learning and Inferring Office Activity from Multimodal Information. In Proc. IEEE Workshop on Cues in Communication, in conjunction with CVPR'01, Hawaii, Dec. 2001.

N. Oliver, E. Horvitz, and A. Garg. Layered Representations for Human Activity Recognition. In Proc, of the Fourth IEEE International Conference on Multimodal Interaction, Pittsburgh, PA, Oct. 2002, pp. 3-8.

N. Oliver and E. Horvitz. Selective Perception Policies for Limiting Computation in Multimodal Systems: A Comparative Analysis. In Proc. of the Fifth International Conference on Multimodal Interaction, ACM Press, Vancouver, Nov. 2003. 8 pages.

* cited by examiner

SYSTEMS AND METHODS FOR GUIDING ALLOCATION OF COMPUTATIONAL RESOURCES IN AUTOMATED PERCEPTUAL SYSTEMS

TECHNICAL FIELD

The present invention relates generally to data analysis, and more particularly to systems and methods for providing policies to govern of the allocation of computational resources by automated perception systems.

BACKGROUND OF THE INVENTION

Science and technology have made great strides in providing society with tools that increase productivity and decrease human workloads. In this regard, computing technologies have played a huge part in allowing control of complex procedures and machinery which facilitate work. As is typical, once a new technology becomes a "norm" or standard, society demands something better. Quite often, despite the best implementations, a user of technology can become complacent and inattentive at crucial moments of activity. This can lead to personal injuries to the operator and/or serious damage to equipment. Because current technology is largely unaware of a user's "state" or activity, it cannot foresee even what a bystander might deem as an "inevitable" outcome. For example, a bystander watching a motorist who has fallen asleep at the wheel and is approaching a busy intersection would probably predict that an accident is most likely to occur. However, if the vehicle that the sleeping motorist is driving were "aware" that it was being operated by a sleeping driver headed for a busy intersection, the vehicle could implement steps to avert an accident by shutting off the engine, applying brakes, and/or waking the driver in time to avoid an accident.

In a similar fashion, if a system could anticipate a user's needs and/or desires, processes can be deployed to increase that user's productivity. Location and identity have been the most common properties considered as comprising a user's situation in "context-aware" systems. Context can include other aspects of a user's situation, such as the user's current and past activities and intentions.

Most of the prior work on leveraging perceptual information to recognize human activities has centered on the identification of a specific type of activity in a particular scenario. Many of these techniques are targeted at recognizing single, simple events, e.g., "waving the hand" or "sitting on a chair." Less effort has been applied to research on methods for identifying more complex patterns of human behavior, extending over longer periods of time.

Another tool utilized in determining action based on awareness is decision theory. Decision theory studies mathematical techniques for deciding between alternative courses of action. The connection between decision theory and perceptual systems (e.g., computer vision applications) received some attention by researchers in the mid-70's, but then interest faded for nearly a decade. Decision theory was utilized to characterize the behavior of vision modules (see, R. C. Bolles; Verification Vision For Programmable Assembly; In *Proc. IJCAI'77*, pages 569-575; 1977), to score plans of perceptual actions (see, J. D. Garvey; Perceptual Strategies For Purposive Vision; Technical Report 117; SRI International; 1976), and plans involving physical manipulation with the option of performing simple visual tests (see, J. A. Feldman and R. F. Sproull; Decision Theory And Artificial Intelligence II: The Hungry Monkey; *Cognitive Science*, 1:158-192; 1977). This early work introduced decision-theoretic techniques to the perceptual computing community.

Following this early research, there was a second wave of interest in applying decision theory in perception applications in the early 90's, largely for computer vision systems (see, H. L. Wu and A. Cameron; A Bayesian Decision Theoretic Approach For Adaptive Goal-Directed Sensing; *ICCV*, 90:563-567; 1990) and in particular in the area of active vision search tasks (see, R. D. Rimey; Control Of Selective Perception Using Bayes Nets And Decision Theory; Technical Report TR468; 1993).

A significant portion of work in the arena of human activity recognition from sensory information has harnessed Hidden Markov Models (HMMs) (see, L. Rabiner and B. H. Huang; *Fundamentals of Speech Recognition;* 1993) and extensions. Starner and Pentland (see, T. Starner and A. Pentland; Real-Time American Sign Language Recognition From Video Using Hidden Markov Models; In *Proceed. of SCV'95*, pages 265-270; 1995) utilize HMMs for recognizing hand movements used to relay symbols in American Sign Language. More complex models, such as Parameterized-HMMs (see, A. Wilson and A. Bobick; Recognition And Interpretation Of Parametric Gesture; In *Proc. of International Conference on Computer Vision*, ICCV'98, pages 329-336; 1998), Entropic-HMMs (see, M. Brand and V. Kettnaker; Discovery And Segmentation Of Activities In Video; *IEEE Transactions on Pattern Analysis and Machine Intelligence*, 22(8); 2000), Variable-length HMMs (see, A. Galata, N. Johnson, and D. Hogg; Learning Variable Length Markov Models Of Behaviour; *International Journal on Computer Vision*, IJCV, pages 398-413; 2001), Coupled-HMMs (see, M. Brand, N. Oliver, and A. Pentland; Coupled Hidden Markov Models For Complex Action Recognition; In *Proc. of CVPR97*, pages 994-999; 1996), structured HMMs (see, F. Bremond S. Hongeng and R. Nevatia; Representation And Optimal Recognition Of Human Activities; In *Proc. of the IEEE Conference on Computer Vision and Pattern Recognition*, CVPR'00; 2000) and context-free grammars (see, Y. Ivanov and A. Bobick; Recognition Of Visual Activities And Interactions By Stochastic Parsing; *IEEE Trans. on Pattern Analysis and Machine Intelligence, TPAMI,* 22(8):852-872; 2000) have been utilized to recognize more complex activities such as the interaction between two people or cars on a freeway.

In recent years, more general dependency models represented as dynamic Bayesian networks have been adopted for the modeling and recognition of human activities [see, (E. Horvitz, J. Breese, D. Heckerman, D. Hovel, and K. Rommelse; The Lumière Project: Bayesian User Modeling For Inferring The Goals And Needs Of Software Users; In *Proc. of Fourteenth Conf. in Artificial Intelligence*, pages 256-265; 1998), (A. Madabhushi and J. Aggarwal; A Bayesian Approach To Human Activity Recognition; In *Proc. of the 2nd International Workshop on Visual Surveillance*, pages 25-30; 1999), (Jesse Hoey; Hierarchical Unsupervised Learning Of Event Categories; Unpublished Manuscript; 2001), (J. H. Fernyhough, A. G. Cohn, and D. C. Hogg; Building Qualitative Event Models Automatically From Visual Input; In *ICCV'98*, pages 350-355; 1998), (Hilary Buxton and Shaogang Gong; Advanced Visual Surveillance Using Bayesian Networks; In *International Conference on Computer Vision*, pages 111-123; Cambridge, Mass.; June 1995), (Stephen S. Intille and Aaron F. Bobick; A Framework For Recognizing Multi-Agent Action From Visual Evidence; In *AAAI/IAAI'99*, pages 518-525; 1999), and (J. Forbes, T. Huang, K. Kanazawa, and S. Russell; The Batmobile:

Towards A Bayesian Automated Taxi; In *Proc. Fourteenth International Joint Conference on Artificial Intelligence, IJCAI'95*; 1995)].

Finally, beyond recognizing specific gestures or patterns, the dynamic Bayesian network models have been used to make inferences about the overall context of the situation of people. Recent work on probabilistic models for reasoning about a user's location, intentions, and focus of attention have highlighted opportunities for building new kinds of applications and services (see e.g., E. Horvitz, C. Kadie, T. Paek, D. Hovel, Models of Attention in Computing and Communications: From Principles to Applications, Communications of the ACM 46(3):52-59, March 2003 and E. Horvitz, A. Jacobs, and D. Hovel. Attention-Sensitive Alerting; In *Proc. of Conf on Uncertainty in Artificial Intelligence*, UAI'99, pages 305-313; 1999).

Thus, technology researchers have long been interested in the promise of performing automatic recognition of human behavior from observations. Successful recognition of human behavior is critical in a number of compelling applications, including automated visual surveillance and multimodal human-computer interaction (HCI)—considering multiple streams of information about a user's behavior and the overall context of a situation to provide appropriate control and services. There has been progress on multiple fronts. However, a number of challenges remain for developing machinery that can provide rich, human-centric notions of context in a tractable manner without the computational burden generally imposed by these systems.

Computation for visual and acoustical analyses has typically required a large portion—if not nearly all—of the total computational resources of personal computers that make use of such perceptual inferences. It is not surprising to find that there is little interest in invoking such perceptual services when they require a substantial portion of the available CPU time, significantly slowing down more primary applications that are supported and/or extended by the perceptual apparatus. Thus, the pursuit of coherent strategies for automatically limiting the analytic load of perceptual systems has steadily moved to the forefront of the technological challenges facing this field.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to data analysis, and more particularly to systems and methods for providing policies to govern utilization of computational resources by perception systems. Analysis methods, such as expected value of information techniques, rate-based techniques, and random selection techniques and the like, are leveraged to provide a fusion of low-level streams of input data (e.g. raw data) from multiple sources to facilitate in inferring human-centric notions of context while reducing computational resource burdens. In one instance of the present invention, the analysis method utilizes real-time computations of expected value of information in a greedy, one-step look ahead approach to computing the next best set of observations to evaluate at each time step, producing "EVI based-perception." By utilizing a means to dynamically determine which input data are to be utilized from the multiple sources, the present invention provides utility-directed information gathering to enable a significant reduction in system resources. This provides a means to compute an expected value of eliminating uncertainty about a state of inputs and/or features that are under consideration. Thus, of the possible inputs and/or feature combinations, the EVI based system can automatically determine which of them are required for real-time computation relating to a particular context. This allows the present invention to provide a means to guide utilization of a system's resources (and/or inputs) with a consideration of their influence on a global expected utility of the system's performance under uncertainty, reducing computational resource costs and permitting utilization of perception systems on low computationally resourced platforms.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
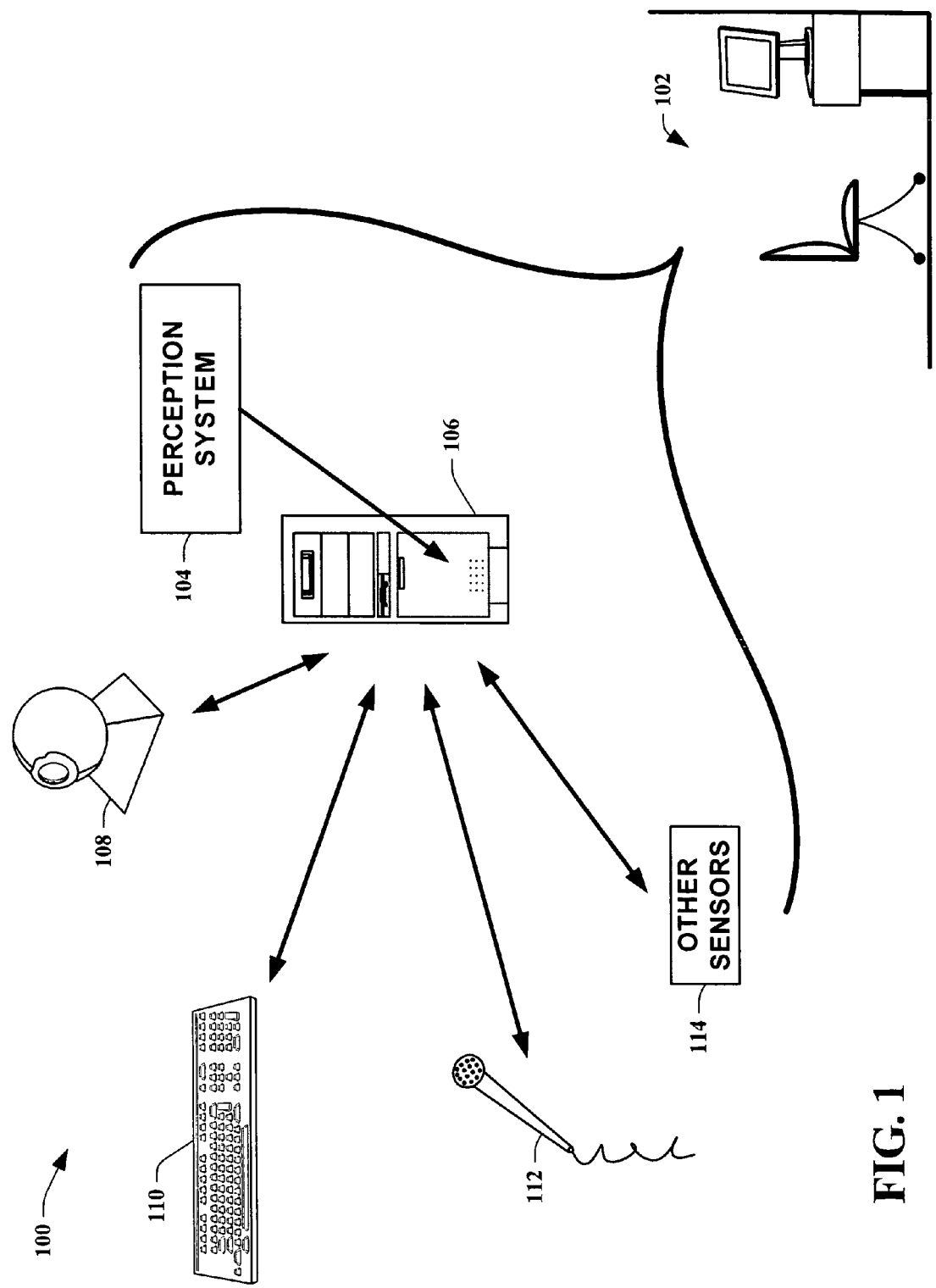
FIG. 1 is an illustration of a typical environment in which a perception system operates in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

A key challenge in inferring human-centric notions of context from multiple sensors is the fusion of low-level streams of raw sensor data—for example, acoustic and visual cues—into higher-level assessments of activity. One instance of the present invention employs a formal decision-theoretic expected value of information (EVI) computation to control inputs for utilization in a system implementation such as, in another instance of the present invention, a one-step look ahead greedy EVI analysis. This instance of the present invention is based on decision-theoretic principles to guide perception. It includes using real-time computations of the expected value of information (EVI) on a frame by frame basis. This is a greedy, single step look ahead approach to computing the next best set of observations to make at each time step. This is referred to as EVI-based perception.

In another instance of the present invention, it can be utilized to provide information relating to volatility of data due to influences of a flow of time. In other words, a system can be constructed utilizing the present invention to determine when and what is an appropriate response given time and a volatility factor for a given piece of data. As an example, a doctor may ask how a patient is feeling when they are first seen. The doctor would not ordinarily ask this question again unless some appropriate amount of time has passed, such as a few days, a week, or the next office visit. The present invention can be utilized to determine the appropriate amount of time based on the volatility of the data. Data that has been disclosed recently would have a net system value much lower than the same data that has not been disclosed for a certain length of time. As the overall net value grows, so does the relevancy of the data.

Though EVI analysis requires additional overhead to a system, a utility-directed information-gathering policy can significantly reduce computational cost of a system by selectively turning features ON and OFF, depending on a situation/context. When comparing an EVI analysis to rate-based and random approaches, EVI provides the best balance between computational cost and recognition accuracy. This approach can be used to enhance multimodal solutions on a path to more natural human-computer interaction. Utilization of selective perception strategies is not a luxury for resource-intensive perceptual systems, but an essential part for their real-world deployment.

A heuristic, rate-based approach can also be utilized to reduce computational needs of a perception system while preserving its recognition accuracy. This policy consists of defining an observational frequency and duty cycle for each feature f. In this approach, each feature f is computed periodically. The period between observations and the duty cycle (amount of time during which the feature is computed) of observation is determined by means of cross-validation on a validation set of real-time data.

The rationale behind this rate-based perception strategy is based on an observation that not all features are needed all the time: a perception system can make accurate inferences about current activity with partial information about a current state of the world. For example, to identify that a presentation is taking place, a system heavily relies on a keyboard and mouse activities and on an audio classification. A video classification and sound localization features become less relevant in this case. Therefore, instead of computing all features all of the time, one could set a high frequency for computation of the audio and keyboard/mouse features, and a low frequency for computing the video and sound localization. By utilizing probabilistic models that process data contained in a sliding window of length T (such as Layered Hidden Markov Models or LHMMs and the like), their inferences are robust to some missing (non-observed) features in some of data points of the sliding window.

Note that rate-based and EVI-based are not necessarily mutually exclusive policies. It is feasible to employ a rate-based paradigm within an EVI framework, utilizing EVI at design time and/or in real-time to identify optimal rates of analyzing each feature. It is also possible, in other instances of the present invention, to have an EVI-mediated, rate-based system.

Finally, one of the simplest strategies to minimize computational load on resources consists of randomly selecting which features to utilize, on a frame-by-frame basis. In this case, an average computational cost of a perception system is constant, independent of current sensed activity, and lower than when computing all features all of the time.

In FIG. 1, an illustration of a typical environment 100 in which a perception system 104 operates in accordance with an aspect of the present invention is shown. The typical environment 100, in this instance of the present invention, is an office setting 102. The perception system 104 resides in a computing system 106 with a variety of perception sensors 108-114. The perception sensors 108-114 are comprised of a video device 108, a computing keyboard device 110, an audio input device 112, and other sensors 114 such as a mouse input device, a motion detection device, and a heat sensing device and the like. The perception system 104 utilizes computing resources of the computing system 106 to analyze perception evidence obtained by the perception sensors 108-114. In this manner perception data can be computed to determine a context in which the computing system 106 is operating. Context can include, for example, situations such as one person present who is working on the computing system 106, one person present who is talking on a telephone, two or more people present having a conversation, and/or a person giving a presentation and the like. The context derived by the perception system 104 can be employed to determine when and/or how to augment other processes and/or devices operative with the computing system 106. Generally, the perception system 104 is computationally intensive, especially when utilizing video evidence. This disrupts the utilization of the computing system 106 and often also disrupts work attempting to be performed by a user of the computing system 106. In contrast, the present invention takes into consideration the context and limits utilization of the computing resources when appropriate to remain unobtrusive to a user. In other instances of the present invention, the user can also decide to input user preferences to control when and/or how computing resources are limited and at what cost.

Figure 2:
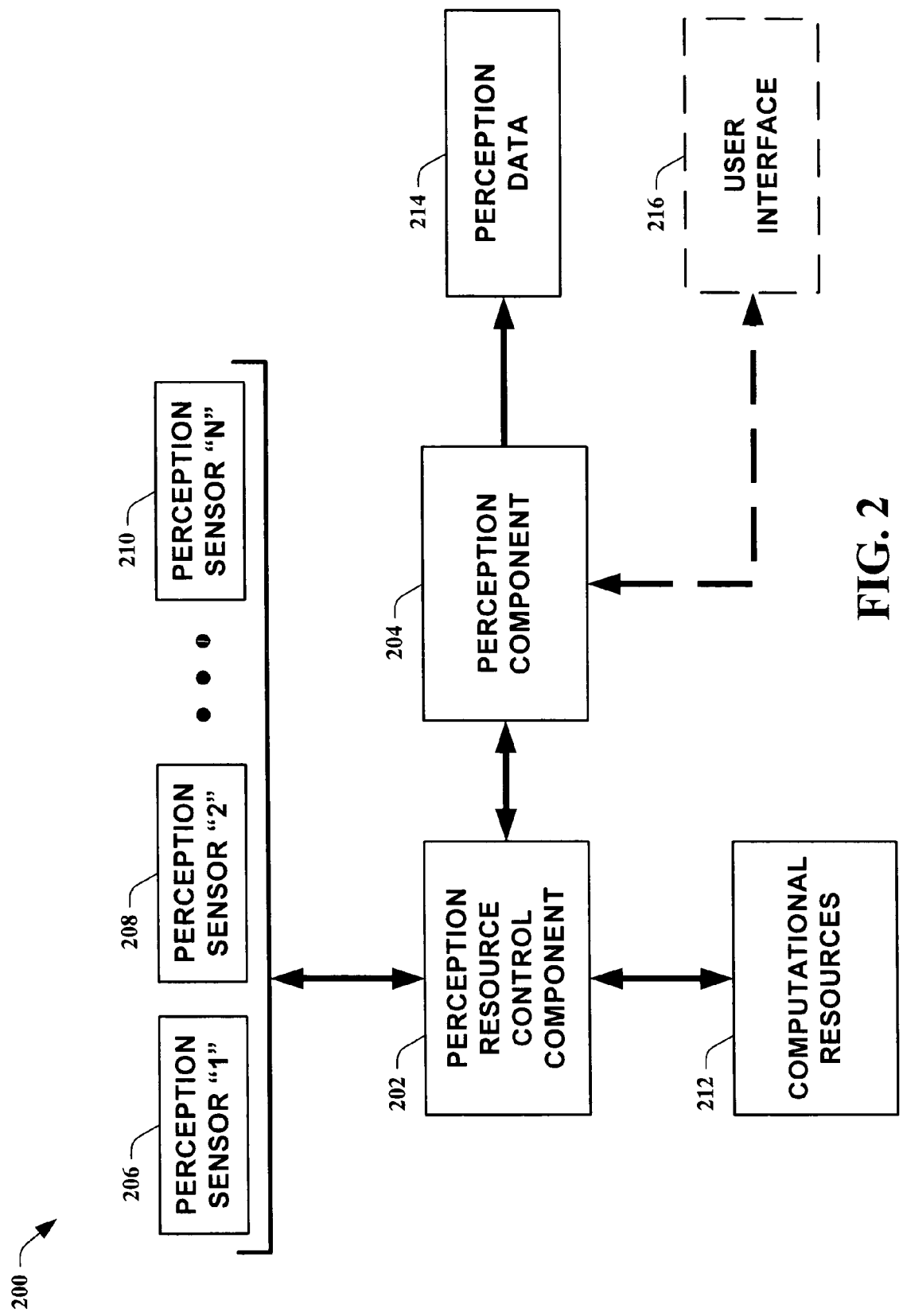
FIG. 2 is a block diagram of a perception system in accordance with an aspect of the present invention.

Referring to FIG. 2, a block diagram of a perception system 200 in accordance with an aspect of the present invention is depicted. In this instance of the present invention, the perception system 200 is comprised of a perception resource control component 202, a perception component 204, perception sensors 206-210, computational resources 212, and perception data 214. The perception sensors 206-210 are comprised of sensor "1" 206, sensor "2" 208, and sensor "N" 210, where N represents any integer from 1 to infinity. The perception sensors 206-210 can include, but are not limited to, such sensors as microphones, video cameras, motion detectors, keyboard usage detectors, mouse usage detectors, and telephone usage detectors and the like. These sensors 206-210 permit the perception system 200 to determine a context in which a system is operating. As is noted later infra, a single sensor can obtain data that is utilized to determine more than one aspect of a context setting. Likewise, a context aspect can often be ascertained from more than one type of sensor. Thus, by utilizing a sensor with the least amount of impact on the computational resources 212, reduced resource utilization in obtaining that context aspect is achieved. The computational resources 212 are generally resources utilized by the perception system 200 to operate the sensors 206-210, process evidence data and output perception data 214.

The perception resource control component 202 provides models and algorithms for optimizing the computational resources 212. It 202 can also interface with the perception sensors 206-210 to provide data and sensor control and/or receive the data via another component and/or provide sensor control to the sensors 206-210 via another component. The perception resource control component 202 can also compute probabilities and process evidence utilized by the perception component 204. The perception component 204 generates perception data 214 and can interact with an optional user interface 216. The perception data 214 is typically comprised of context information that facilitates such items as software programs and the like that rely on utilizing context to achieve optimization in their usage and performance. The perception data 214 itself can also be utilized by the present invention to facilitate control of utilization of computational resources 212. Thus, a particular context can be taken into account when determining how best to utilize the resources 212.

The optional user interface 216 permits user feedback to be utilized in the perception system 200. By utilizing this interface 216, a means to input and/or output costs related to determining perception data to and/or from the user is achieved. This allows a user to "fine tune" their system to achieve an overall performance optimization based on their allowance of computational resource utilization for predetermined activities. In one instance of the present invention, a user can assign a criticality to a particular task. The perception system 200 can then limit its resource utilization so as to not disrupt this critical task. The perception system 200 can also achieve system performance optimization without interacting with a user. The perception component 204, in other instances of the present invention, can provide computational resource control and sensor control based upon data provided by the perception resource control component 202.

Figure 3:
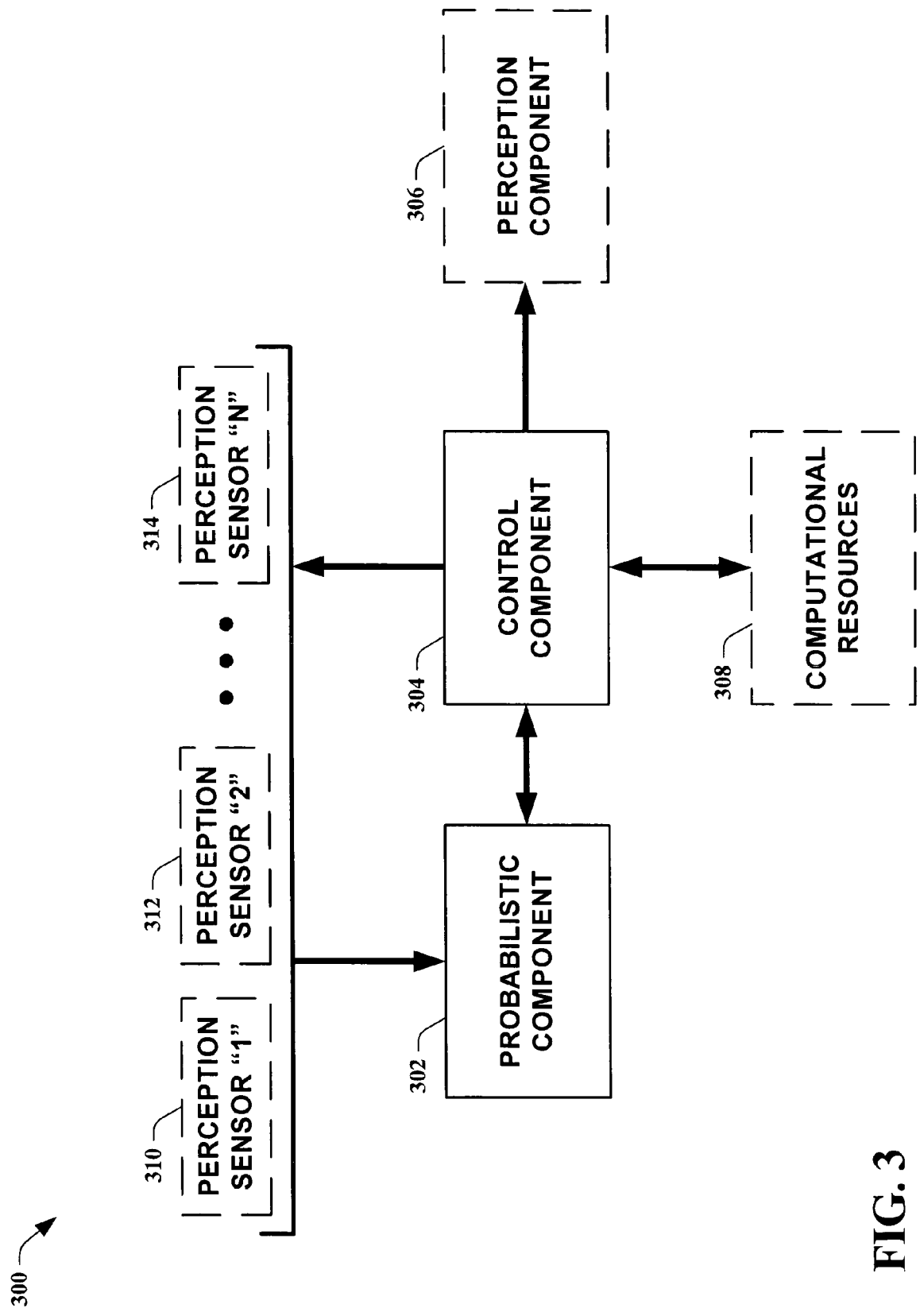
FIG. 3 is a block diagram of a perception resource control component in accordance with an aspect of the present invention.

Turning to FIG. 3, a block diagram of a perception resource control component 300 in accordance with an aspect of the present invention is illustrated. The perception resource control component 300 is comprised of a probabilistic component 302 and a control component 304. The perception resource control component 300 also interacts with perception sensors 310-314, computational resources 308, and a perception component 306. The interactions are representative of only one instance of the present invention as communication can occur to any component from any component dependent upon implementation. The perception sensors 310-314 are comprised of sensor "1" 310, sensor "2" 312, and sensor "N" 314, where N represents any integer from 1 to infinity. As previously stated supra, the sensors 310-314 include such items as microphones, video cameras, and keyboard/mouse detectors and the like. The computational resources 308 are those resources utilized by a perception system to operate the perception sensors 310-314, process evidence data from the sensors 310-314, and output perception data and the like.

The probabilistic component 302 provides models and algorithms for optimizing resources. It 302 can also include an interface for interacting with the perception sensors 310-314 for retrieving data and/or control purposes. Information from the perception sensors 310-314 can also be received from other components such as the control component 304 and the like. The probabilistic component 302 computes probabilities associated with analyzing data and processes evidence gathered from perception sensors. The control component 304 utilizes a selective gathering of evidence process to determine what sensors are employed when and for how long. In this manner, a reduction in utilization of the computational resources 308 is achieved by a perception system. The control component 304 can also incorporate user data obtained via a user interface (not illustrated) to determine the best utilization of the computational resources 308. This can include passing data related to evidence analysis from the probabilistic component 302 to a user via the perception component 306 and the like. This allows a user to determine if a cost associated with analyzing a particular aspect is bearable by the user. The control component 304 can also limit utilization of computational resources 308 by controlling which perception policy is utilized by the probabilistic component 302. The control component 304 can also make the perception policy decision based upon a context of a perception system and/or utilize a threshold value that a net value of obtaining a feature must surpass before employing resources.

One example of an implementation of the present invention to control perceptual analysis utilizes a system designed by Microsoft Corporation called the SEER system, a prototype context-sensing system that employs probabilistic machinery (e.g., Layered, Hidden Markov Models or LHMMs) to provide real-time interpretations of human activity in and around an office (see, N. Oliver, E. Horvitz, and A. Garg; Layered Representations For Human Activity Recognition; In *Proc. of Int. Conf on Multimodal Interfaces*, pages 3-8; 2002). The greedy, one-step look ahead EVI-based perception instance of the present invention is compared to other methods of perception, such as rate-based perception methods that analyze all features all of the time (i.e., without selective perception) and random feature selection perception where features are randomly selected at each step, in this example, see infra.

Employment of a layering of probabilistic models at different levels of temporal abstraction was explored utilizing SEER. This representation allows a system to learn and recognize on-the-fly common situations in office settings (see, id). Although the methods work well, a great deal of perceptual processing is required by the system, consuming most of the resources available by personal computers. Thus, a more resource cost effective approach is required for selecting on-the-fly the most informative features. An expected value of information (EVI) analysis is utilized in the present invention to select on-the-fly the most informative features, based on a utility model that captures the overall goals of a system, reducing system resource utilization.

To better understand the intricacies of the present invention, the following example of one instance of the present invention relates to an implementation involving the SEER system mentioned supra. One skilled in the art will appreciate that the present invention can easily be applied and/or utilized to other systems and the like. Although the legacy SEER system performs well, it consumes a large portion of available CPU time to process video and audio sensor input information to make inferences. Thus, expected value of information (EVI) is utilized to determine dynamically which features to extract from sensors in different contexts, saving valuable resources. EVI policies for guiding sensing and computational analysis of sensory information endow SEER with an ability to limit computation with utility-directed information gathering.

The following properties of SEER and its problem domain are conducive to implementing an EVI analysis: (1) a decision model is available that allows the system to make decisions with incomplete information where the quality of the decision increases as more information becomes available; (2) the decision model can be utilized to determine the value of information for different sets of variables utilized in the decision; (3) there are multiple information sources for each piece of information utilized in the decision, associated with different costs and response times; (4) the system operates in a personal computing environment that provides limited resources (CPU, time): gathering all the relevant information all the time before making the decision is very expensive.

A critical issue is deciding which information to collect when there is a cost associated with its collection. Classical decision theory provides an overall mathematical framework for reasoning about the net value of information (see, R. Howard; Value Of Information Lotteries; *IEEE Trans. on Systems, Science and Cybernetics*, SSC-3, 1:54-60; 1967). In computing the EVI for a perceptual system, the expected value of eliminating uncertainty about the state of the features under consideration, for instance—$f_k$, k=1 ... K, is computed. For example, the features associated with the vision sensor (camera) are motion density, face density, foreground density and skin color density in the image. Thus, there are K=16 possible combinations of these features. It is desirable for the system to automatically determine which features to compute in real-time, depending on the context (in the following, features will be referred to instead of sensors, because one can compute several different features for each sensor input—e.g., skin density, face density, motion density, etc., for the camera sensor.).

For perceptual decisions that are grounded in models of utility, it is desirable to guide the sensing actions with a consideration of their influence on a global expected utility of a system's performance under uncertainty. Thus, it is helpful to endow a perceptual system with knowledge about a value of action in a system's world. In one instance of the present invention, for example, utility is encoded as a cost of misdiagnosis for a context in which the system is deployed. Utilities, $U(M_i, M_j)$, are assessed as a value of asserting that real-world state $M_i$ is $M_j$. In any context, a maximal utility is associated with an accurate assessment of $M_j$ as $M_j^-$.

To evaluate uncertainty about an outcome of observations, let $f_k^m$, m=1 ... M to denote all possible values of the feature combination $f_k$, and E to refer to all previous observational evidence. An expected value (EV) of computing a feature combination $f_k$ is therefore:

$$EV(f_k) = \sum_m P(f_k^m \mid E) \max_i \sum_j P(M_j \mid E, f_k^m) U(M_i, M_j) \quad \text{Eq. (1)}$$

An expected value of information (EVI) of evaluating a perceptual feature combination $f_k$ is the difference between an expected utility of the system's best action when observing the features in $f_k$ and not observing $f_k$, minus the cost of sensing and computing such features, cost($f_k$). If a net expected value is positive, then it is worth collecting information and, therefore, computing a feature. Because there is uncertainty about a value that a system will observe when it evaluates $f_k$, a change in expected value is considered given a current probability distribution, $P(f_k^m \mid E)$ of different values m that would be obtained if features in $f_k$ would in fact be computed.

$$EVI(f_k) = EV(f_k) - \max_i \sum_j P(M_j \mid E) U(M_i, M_j) - cost(f_k) \quad \text{Eq. (2)}$$

where cost($f_k$) is, in this case, a computational cost associated with computing feature combinations $f_k$.

In distinction to traditional applications of EVI, perceptual systems normally incur significant cost with computation of features from inputs, such as sensors. Thus, information value of observations is traded with a cost due to an analysis required to make observations.

Just as detailed preferences can be acquired about a value model, preferences can be assessed about a cost of computation in different settings. The cost can be represented by a rich model that takes continual changes in a usage context into account. For a system like SEER, which was designed to run in the background, monitoring a user's daily activities in an office, a cost of computation is much higher when the user is engaged in a resource-intensive primary computing task than when the user is not using the computer. Thus, there is opportunity for building a rich cost model that takes into consideration a likelihood that a user will experience poor responsiveness given a portion of CPU that is being utilized by a perceptual apparatus of SEER and the like.

The present invention can also be utilized in single and multi-step analyses. Typically, a greedy EVI approach is utilized, where a piece of evidence (normally a single feature or variable) associated with a highest EVI is identified. Note that the present invention has extended this approach by reasoning about and/or searching over combinations of features associated with a greatest EVI, i.e., $f^* = \text{argmax}_k EVI(f_k)$.

As indicated by Equation (1), computation of EVI, even in the case of greedy analysis, requires for each piece of unobserved evidence, probabilistic inference about an outcome of seeing a spectrum of alternate values should that observation be computed. Thus, even one-step lookaheads can be computationally costly. A variety of less expensive approximations for EVI have been explored (see, M. Ben-Bassat; Myopic Policies In Sequential Classification; *IEEE Trans. Comput.*, 27:170-178; 1978 and D. Heckerman, E. Horvitz, and B. Middleton; A Non-Myopic Approximation For Value Of Information; In *Proc. Seventh Conf on Uncertainty in Artificial Intelligence*; 1991). As described next, dynamic programming in HMMs is exploited to achieve an efficient algorithm to determine an EVI associated with each feature combination.

In the present invention, a graphical model framework is embedded in an architecture with two interconnected modules: a first module (probabilistic module) specifies a graphical model and its associated algorithms for computing probabilities and processing evidence. A second module (control module) incorporates a method for selective gathering of evidence. Both modules cooperate such that the control module queries the probabilistic module for information about the variables of interest and decides on what computations should be performed next by the probabilistic module.

In one instance of the present invention, probabilistic modules are HMMs and the like, with one HMM per class. In the case of HMMs, with continuous observation sequences $\{O_1, \ldots, O_t, O_{t+1}\}$, a term is computed, namely:

$$P(f_k^m \mid E) = \sum_n p\left(O_{t+1}^{f_k^m} \mid M_n\right) P(M_n) \qquad \text{Eq. (3)}$$

$$\propto \sum_n \left[\sum_s \alpha_t^n(s) \sum_l a_{sl}^n b_l^n\left(O_{t+1}^{f_k^m}\right)\right] P(M_n)$$

where $\alpha_t^n(s)$ is the alpha or forward variable at time t and state s in the standard Baum-Welch algorithm (see, L. R. Rabiner; A Tutorial On Hidden Markov Models And Selected Applications In Speech Recognition; *Proceed. of the IEEE*, 77(2): 257-286; February 1989), $a_{sl}^n$ is the transition probability of going from state s to state l, and $$b_l^n\left(O_{t+1}^{f_k^m}\right)$$

is the probability of observing $$O_{t+1}^{f_k^m}$$

in state l, all of them in model $M_n$. It should also be noted that the present invention is employable in non-continuous settings as well.

And, therefore, EVI is given by (for the sake of conciseness, the conditioning on the previous evidence, E (observations in the HMMs case $\{O_1 \ldots O_t\}$) will be dropped.):

$$EVI(f_k) = \int p\left(O_{t+1}^{f_k}\right) \max_i \sum_j U(M_i, M_j) p(M_j) d_{O_{t+1}^{f_k}} - \qquad \text{Eq. (4)}$$

$$\max_i \sum_j U(M_i, M_j) p(M_j) - cost\left(O_{t+1}^{f_k}\right)$$

$$\propto \int \sum_n \left[\sum_s \alpha_t^n(s) \sum_l a_{sl}^n b_l^n\left(O_{t+1}^{f_k}\right)\right] P(M_n)$$

$$\max_i \sum_j U(M_i, M_j) p(M_j) d_{O_{t+1}^{f_k}} -$$

$$\max_i \sum_j U(M_i, M_j) p(M_j) - cost\left(O_{t+1}^{f_k}\right)$$

If the observation space is discretized, Equation (4) becomes:

$$EVI \propto \sum_m \sum_n \left[\sum_s \alpha_t^n(s) \sum_l a_{sl}^n b_l^n\left(O_{t+1}^{f_k^m}\right)\right] P(M_n) \qquad \text{Eq. (5)}$$

$$\max_i \sum_j U(M_i, M_j) p(M_j) -$$

$$\max_i \sum_j U(M_i, M_j) p(M_j) - cost\left(O_{t+1}^{f_k}\right)$$

In the selective SEER or "S-SEER" implementation of an instance of the present invention, the observation space is discretized into M bins, where M is typically 10. The computational overhead added to carry out an EVI analysis is—in a discrete case—$O(M*F*N^2*J)$, where M is a maximum cardinality of features, F is a number of feature combinations, N is a maximum number of states in HMMs, and J is a number of HMMs.

As a further example of implementing an instance of the present invention, feature extraction and selection in a layered HMM version of S-SEER is described in more detail. Raw sensor signals are preprocessed in SEER to obtain feature vectors (i.e., observations) for a first layer of HMMs. With respect to audio analysis, Linear Predictive Coding coefficients (see, L. Rabiner and B. H. Huang; *Fundamentals of speech Recognition;* 1993) are computed. Feature selection is applied to these coefficients via principal component analysis. The number of features is selected such that at least 95% of the variability in data is maintained, which is typically achieved with no more than 7 features. Other higher-level features are also extracted from the audio signal, such as its energy, the mean and variance of the fundamental frequency over a time window, and the zero crossing rate (see, id). The source of the sound is localized using a Time Delay of Arrival (TDOA) method.

Four features are extracted from a video signal: a density of skin color in an image (obtained by discriminating between skin and non-skin models, consisting of histograms in YUV color space), a density of motion in the image (obtained by image differences), a density of foreground pixels in the image (obtained by background subtraction, after having learned the background), and a density of face pixels in the image (obtained by means of a real-time face detector (see, S. Z. Li, X. L. Zou, Y. X. Hu, Z. Q. Zhang, S. C. Yan, X. H. Peng, L. Huang, and H. J. Zhang; Real-Time Multi-View Face Detection, Tracking, Pose Estimation, Alignment, And Recognition; 2001)). Finally, a history of the last 1, 5 and 60 seconds of mouse and keyboard activities is logged.

The architecture of S-SEER employs a two-level layered HMMs architecture with three processing layers. A lowest layer captures video, audio, and keyboard and mouse activity, and computes feature vectors associated to each of these signals. A middle layer includes two banks of distinct HMMs for classifying audio and video feature vectors. The structure for each of these HMMs is determined by means of cross-validation on a validation set of real-time data. On the audio side, one HMM is trained for each of the following office sounds: human speech, music, silence, ambient noise, phone ringing, and sounds of keyboard typing. In the architecture, all HMMs are run in parallel. At each instant, a model with the highest likelihood is selected and data—e.g., sound in the case of audio HMMs—is classified correspondingly. These kinds of HMMs are referred to as discriminative HMMs. Video signals are classified using another bank of discriminative HMMs that implement a person detector. At this level, a system detects whether nobody, one person (semi-static), one active person, or multiple people are present in the office.

Each bank of HMMs can use any previously defined selective perception strategies to determine which features to utilize. For example, a typical scenario is one where a system utilizes EVI analysis to select in real-time motion and skin density features when there is one active person in an office, and skin density and face detection when there are multiple people present.

Inferential results (see, N. Oliver, E. Horvitz, and A. Garg; Layered Representations For Human Activity Recognition; In *Proc. of Int. Conf on Multimodal Interfaces*, pages 3-8; 2002 for a detailed description of how to utilize these inferential results) from this layer (i.e., outputs of audio and video classifiers), a derivative of a sound localization component, and a history of keyboard and mouse activities constitute a feature vector that is passed to a next (third) and highest layer of analysis. This layer handles concepts with longer temporal extent. Such concepts include a user's typical activities in or near an office such as, for example, a phone conversation, a presentation, a face-to-face conversation, a user present, a user engaged in some other activity, a distant conversation (outside a field of view), and nobody present. Some of these activities can be utilized in a variety of ways in services and the like, such as those that identify a person's availability and the like. The models at this level are also discriminative HMMs, and they can also utilize selective perception policies to determine which inputs from a previous layer to use.

The impacts of the three policies, including EVI-based, rate-based, and random algorithm approaches were assessed in regard to automatic feature selection in both accuracy of the models and computational cost of a perception system. Both in Tables 1, 2 and 3, and also in FIG. 4, abbreviations are utilized as follows: PC=Phone Conversation; FFC=Face to Face Conversation; P=Presentation; O=Other Activity; NP=Nobody Present; and DC=Distant Conversation.

Figure 4:
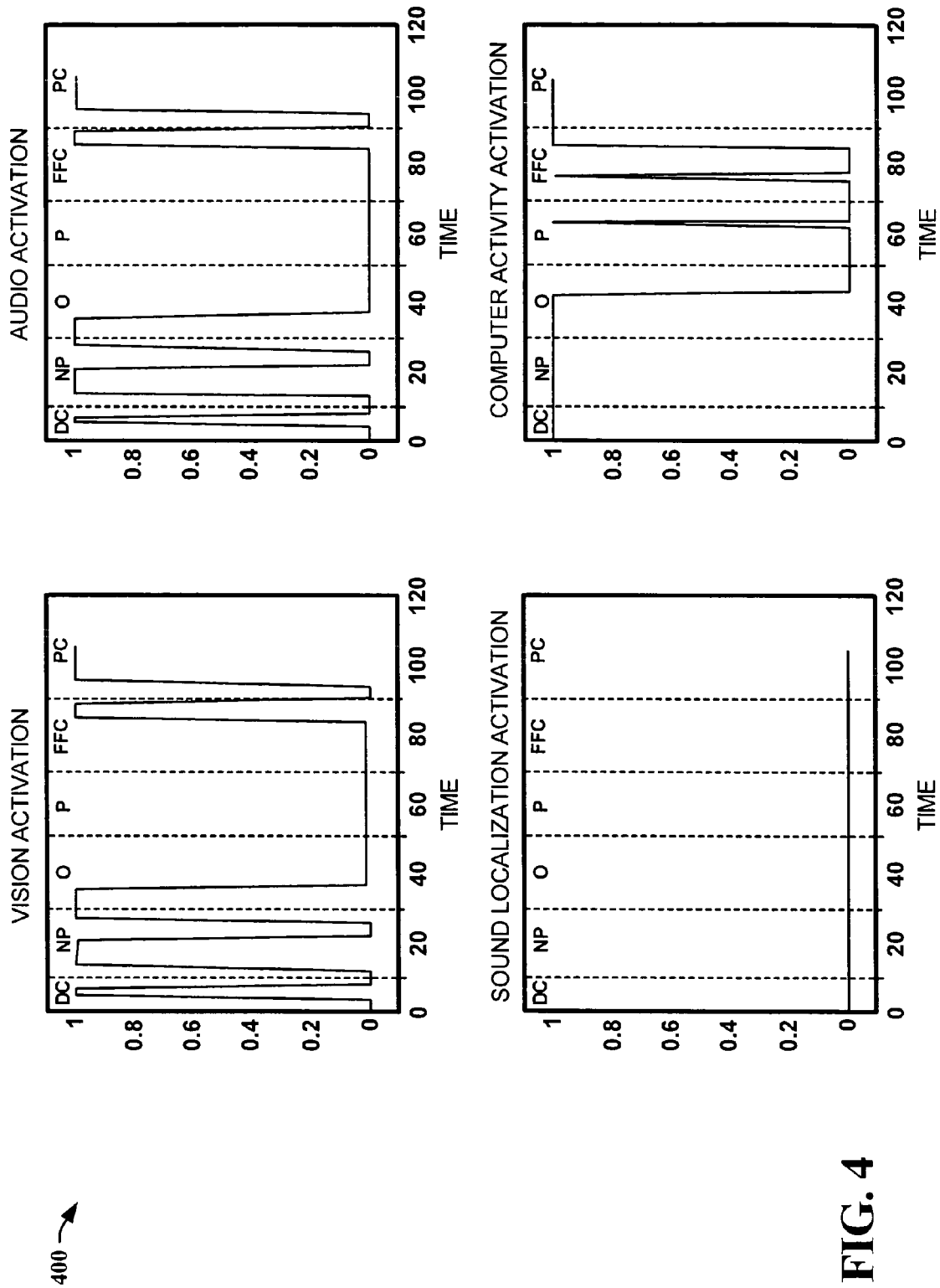
FIG. 4 is a depiction of graphs illustrating an aspect of the present invention.

In FIG. 4, a depiction of graphs 400 illustrating an aspect of the present invention is shown. FIG. 4 illustrates automatic turning ON and OFF of features when running an EVI analysis in S-SEER in an office and switching between different activities. The figure only contains transitions between activities. If a feature was turned ON, its activation value in a graph is 1 whereas it is 0 if it was turned OFF. Vertical lines indicate a change of activity and labels on top show which activity was taking place at that moment. In this experiment, a simple utility model is assumed to be represented as an identity matrix.

Some observations that can be noted from FIG. 4 are: (1) At times the system does not use any features at all—as for example at time=50, because it is confident enough about a situation, and it selectively turns features ON when necessary; (2) As a consequence, the system guided by EVI has a longer switching time (i.e., the time that it takes for the system to realize that a new activity is taking place) than when using all the features all the time. EVI computations trigger a utilization of features again only after the likelihoods of models have sufficiently decreased, i.e., none of the models is a good explanation of data; (3) In the example, the system never turns a sound localization feature ON, due to its high computational cost versus the relatively low informational value the acoustical analysis provides.

Tables 1 and 2 compare an average recognition accuracy and average computational cost (measured as % of CPU usage) when testing S-SEER on 600 sequences of office activity (100 sequences per activity) with and without (first column, labeled "Nothing") selective perception. Note how S-SEER with selective perception achieved as high a level of accuracy as when using all the features all the time, but with a significant reduction on the CPU usage.

TABLE 1

Average Accuracies for S-SEER with and without different selective perception strategies.
Recognition Accuracy (%)

|     | Nothing | EVI  | Rate-based | Random |
|-----|---------|------|------------|--------|
| PC  | 100     | 100  | 29.7       | 78     |
| FFC | 100     | 100  | 86.9       | 90.2   |
| P   | 100     | 97.8 | 100        | 91.2   |
| O   | 100     | 100  | 100        | 96.7   |
| NP  | 100     | 98.9 | 100        | 100    |
| DC  | 100     | 100  | 100        | 100    |

These results correspond to the following observational rates (in seconds): 10 for an audio channel, 20 for a video channel, 0.03 for keyboard and mouse activities and 20 for sound localization. The recognition accuracy for "phone conversation" in the rate-based approach is much lower than for any of the other activities. This is because the system needs to use video information more often than every 20 seconds in order to appropriately recognize that a phone conversation is taking place. If the rate of using video is raised to 10 seconds, while keeping the same observational frequencies for the other sensors, the recognition accuracy for "phone conversation" becomes 89%, with a computational cost of 43%.

TABLE 2

Average Computational Costs for S-SEER with and without different selective perception strategies.
Computational Costs (% of CPU time)

|     | Nothing | EVI   | Rate-based | Random |
|-----|---------|-------|------------|--------|
| PC  | 61.22   | 44.5  | 37.7       | 47.5   |
| FFC | 67.07   | 56.5  | 38.5       | 53.4   |
| P   | 49.80   | 20.88 | 35.9       | 53.3   |
| O   | 59      | 19.6  | 37.8       | 48.9   |
| NP  | 44.33   | 35.7  | 39.4       | 41.9   |
| DC  | 44.54   | 23.27 | 33.9       | 46.1   |

The EVI-based approach experiments described supra correspond to utilizing an identity matrix as the system's utility model, $U(M_i, M_j)$ in Equation (2), and a measure of cost, $cost(f_k)$ in Equation (2), associated with percentage of CPU usage. However, more detailed models can be assessed that capture a user's personal preferences about different misdiagnoses in various usage contexts and about latencies associated with computation for perception.

As an example, one can assess in dollars, for example, a specific cost to a user of misclassifying $M_i$ as $M_j$, where i, j=1 ... N in a specific context. In one assessment technique, for each actual office activity $M_i$, dollar amounts are sought that users would be willing to pay to avoid having an activity misdiagnosed as $M_j$ by an automated system, for all N−1 possible misdiagnoses. Table 3 illustrates an example assessment of a cost of misdiagnosis model assessed from a user relying on usage of SEER inferences for a task of controlling incoming notifications.

TABLE 3

Example of assessment of the cost of misdiagnosis for a particular user.

|     | PC | FFC | P | O | NP | DC |
|-----|----|----|---|---|----|----|
| PC  | 0  | 2  | 0 | 5 | 5  | 5  |
| FFC | 2  | 0  | 5 | 5 | 6  | 5  |
| P   | 3  | 3  | 0 | 7 | 6  | 8  |
| O   | 2  | 4  | 7 | 0 | 6  | 5  |
| NP  | 5  | 6  | 2 | 8 | 0  | 7  |
| DC  | 5  | 6  | 2 | 8 | 1  | 0  |

In determining a real world measure of an expected value of computation, deeper semantics also need to be considered of computational costs associated with perceptual analysis. To make cost-benefit tradeoffs, computational cost and utility is mapped to the same currency (or cost indicator and the like). Thus, cost can be assessed in terms of dollars, for example, that a user would be willing to pay to avoid latencies associated with a computer loaded with perceptual tasks.

Operating systems are complex artifacts, and perceptual processes can bottleneck a system in different ways (e.g., disk i/o, CPU, graphics display). In a detailed model, dependencies must be considered among specific perceptual operations and different kinds of latencies associated with primary applications being executed by users. As an approximation, a relationship between latencies for common operations in typical applications and total load on a CPU is characterized. A function is assessed linking latencies to a user's willingness to pay (in dollars) to avoid such latencies during typical computing sessions. In the end, a cost model is achieved that provides a dollar cost as a function of computational load.

Similar to a value model, represented as a context-sensitive cost of misdiagnosis, key contextual considerations can be introduced into a cost model. For example, cost models can be conditioned on a specific software application that has focus at any moment. Settings can also be considered where a user is not explicitly interacting with a computer (or is not relying on a background execution of primary applications), versus cases where a user is interacting with a primary application, and thus, at risk of experiencing costly latencies.

To illustrate, impact of an activity-dependent cost model is assessed in an EVI-based perception approach by running S-SEER on 900 sequences of office activity (150 seq/activity) with a fixed cost model (e.g., the computational cost) and an activity-dependent cost model. In the latter case, a cost of evaluating features was penalized when a user was interacting with a computer (i.e., in "presentation" and "person present-other activity"), and it was reduced when there was no interaction (i.e., in "nobody present" and "distant conversation overheard").

Table 4 summarizes the findings. It contains a percentage of time per activity that a particular feature was "ON" both with constant costs and activity-dependent costs. Note how the system selects less frequently computationally expensive features (such as video and audio classification) when there is a person interacting with the computer (third and fourth columns in the table) while it uses them more frequently when there is nobody in front of the computer (last two columns in the table). There was no significant difference in the average accuracy of both approaches.

TABLE 4

Impact of a variable cost model in EVI-based selective perception as measured in percentage of time that a particular feature was "ON"

|           | PC   | FFC  | P    | O    | NP   | DC   |
|-----------|------|------|------|------|------|------|
| Constant Cost ||||||||
| Video     | 86.7 | 65.3 | 10   | 10   | 78.7 | 47.3 |
| Audio     | 86.7 | 65.3 | 10   | 10   | 78.7 | 47.3 |
| Sound Loc | 0    | 0    | 0    | 0    | 0    | 0    |
| Kb/Mouse  | 100  | 100  | 27.3 | 63.3 | 80.7 | 100  |
| Variable Cost ||||||||
| Video     | 78   | 48.7 | 2    | 1.3  | 86   | 100  |
| Audio     | 78   | 40.7 | 2    | 1.3  | 86   | 100  |
| Sound Loc | 14.7 | 0    | 2    | 1.3  | 86   | 100  |
| Kb/Mouse  | 100  | 100  | 53.3 | 63.3 | 88   | 100  |

Table 5 compares average recognition accuracies between constant and variable computational cost (measured as % of CPU usage) models when testing S-SEER on sequences of office activity with EVI-based selective perception. S-SEER with EVI-based perception achieves a high a level of accuracy even when utilizing a variable cost model.

TABLE 5

Average accuracies of S-SEER with constant and variable cost model in EVI-based selective perception
Recognition Accuracy (%)

|     | Constant Cost | Variable Cost |
|-----|---------------|---------------|
| PC  | 100           | 82.27         |
| FFC | 100           | 100           |
| P   | 97.8          | 97.7          |
| O   | 100           | 87            |
| NP  | 98.9          | 98.5          |
| DC  | 100           | 100           |

SEER's domain level reasoning can be harnessed to provide a probability that a primary activity at hand involves interaction with a desktop system. If a cost of computation is assumed to be zero when users are not using a computer, such a likelihood can be harnessed to generate an expected cost (EC) of perception as follows:

$$EC(Lat(f_k), E) = C(Lat(f_k), E)\left(1 - \sum_{i=1}^{m} P(M_i \mid E)\right) \quad \text{Eq. (6)}$$

where $Lat(f_k)$ represents a latency associated with executing an observation and analysis of a set of features $f_k$, E represents evidence already observed, and an index 1 ... m contains a subset activities of N total activities being considered that do not involve a user's usage of a computer. Thus, a probability distribution over inferred activities changes the cost structure. As EVI-based methods weigh costs and benefits of making observations, systems representing expected cost as described would typically shift their selective perception policies in situations where a user begins to task a system with an interactive application.

In view of the exemplary systems shown and described above, methodologies that may be implemented in accordance with the present invention will be better appreciated with reference to the flow charts of FIGS. 5-9. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 5:
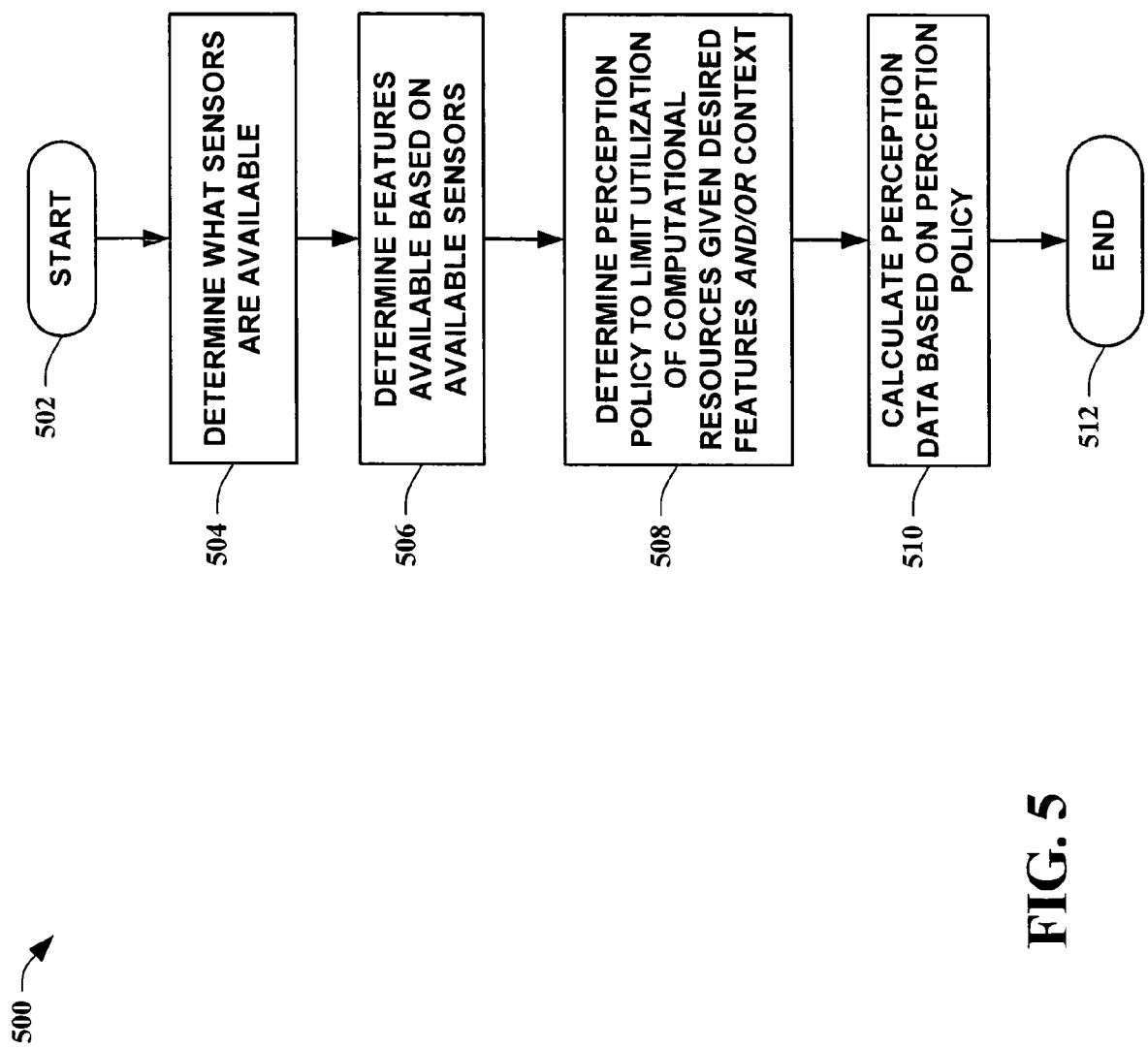
FIG. 5 is a flow diagram of a method of selecting a perception policy in accordance with an aspect of the present invention.

In FIG. 5, a flow diagram of a method 500 of selecting a perception policy in accordance with an aspect of the present invention is shown. The method 500 starts 502 by determining what perception sensors are available for gathering context evidence 504. Once available sensors have been established, it is determined what features are available based upon the available sensors 506. A single sensor can provide several features by itself and/or two sensors can provide a substantially similar feature, but one sensor may require less computing resources. A determination is then made as to which perception policy can be employed to limit utilization of computational resources based on desired features and/or context of a perception system 508. The selection or determination of the perception policy can be accomplished via such means as look-up tables, historical data/practices, and predetermined approaches and the like. The selection can also be based upon prior performance of a perceptual system in reducing computational resources. User provided input such as operational characteristics, desired features, and computational loading, and the like can also be utilized in determining an appropriate perception policy. Controllability of perception sensors can also facilitate the selection process. A policy, such as a rate-based policy, is facilitated by sensors that can be sequenced and duty cycled. If a perception system resides on a simplistic computational device, it might utilize a less complex policy such as a random-based policy and the like. Once the perception policy has been selected, perception data is calculated based upon the selected perception policy 510, ending the flow 512. This data is generally utilized by software applications and the like to achieve better performance by being "context-aware."

Figure 6:
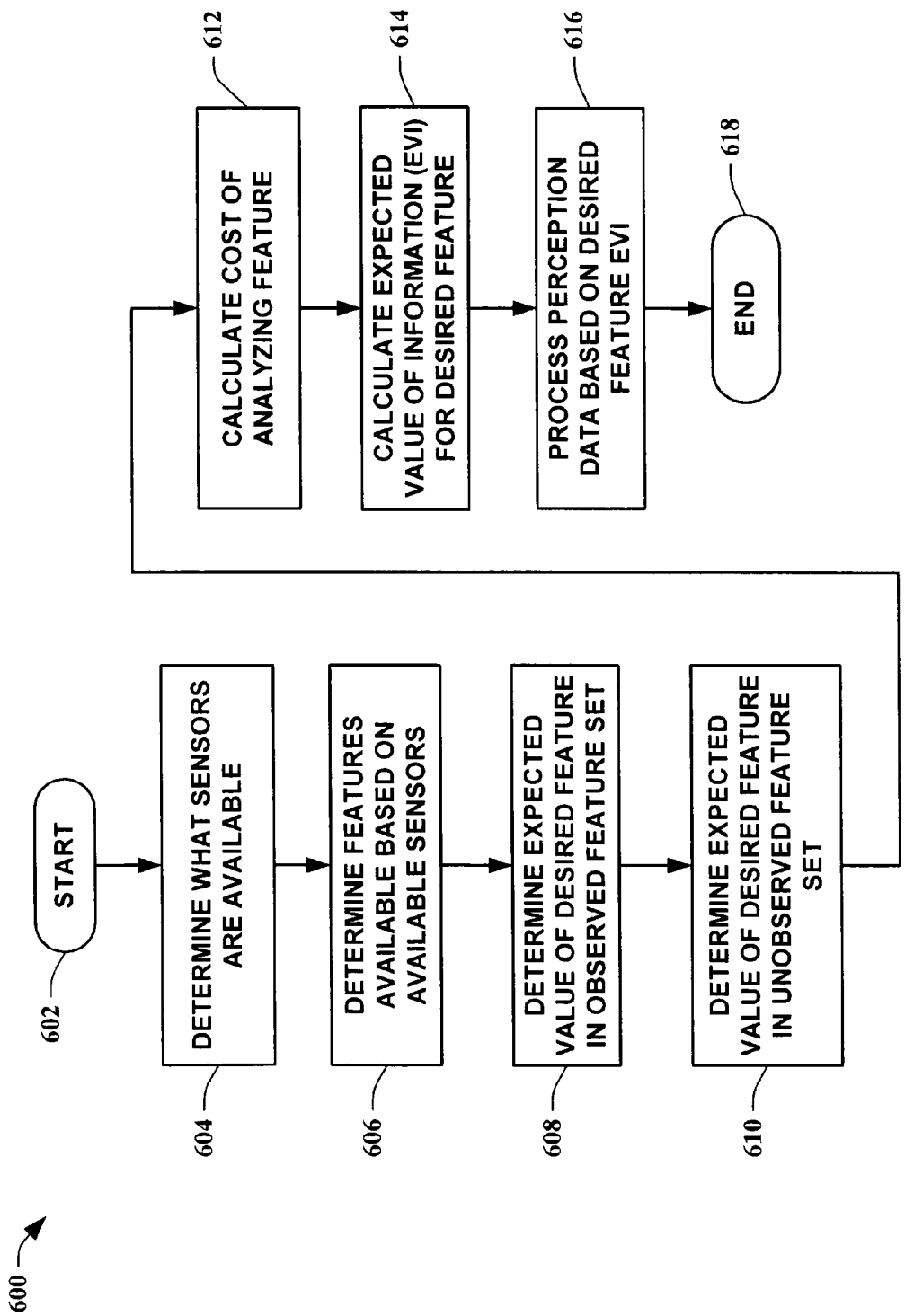
FIG. 6 is a flow diagram of a method of utilizing EVI-based perception in accordance with an aspect of the present invention.

Referring to FIG. 6, a flow diagram of a method 600 of utilizing EVI-based perception in accordance with an aspect of the present invention is depicted. The method 600 starts 602 by determining what perception sensors are available for gathering perception evidence 604. Once available sensors have been established, it is determined what features are available based upon the available sensors 606. A single sensor can provide several features by itself and/or two sensors can provide a substantially similar feature, but one sensor may require less computing resources. An expected value of a desired feature is then determined based upon observed evidence 608. An expected value of the desired feature is then determined based upon unobserved evidence 610. A cost of analyzing the desired feature is then calculated 612. By utilizing a form of Equation (2):

$$EVI(f_k) = EV(f_k) - \max_i \sum_j P(M_j | E)U(M_i, M_j) - cost(f_k) \quad \text{Eq. (2)}$$

an expected value of information (EVI) can be determined for the desired feature 614. One skilled in the art will recognize that other variations of the above equation can be utilized in the present invention to determine an EVI value, such as, for example, Equations (4) and (5). This EVI value for the desired feature is then utilized to process perception data accordingly 616, ending the flow 618. Thus, if the EVI value is too low, the desired feature might not be analyzed due to its overall value. Contrarily, if the EVI value is high, the desired feature might be analyzed with priority for available resources. In one instance of the present invention, a feature combination is selected based upon a maximal EVI value represented by a feature combination.

Figure 7:
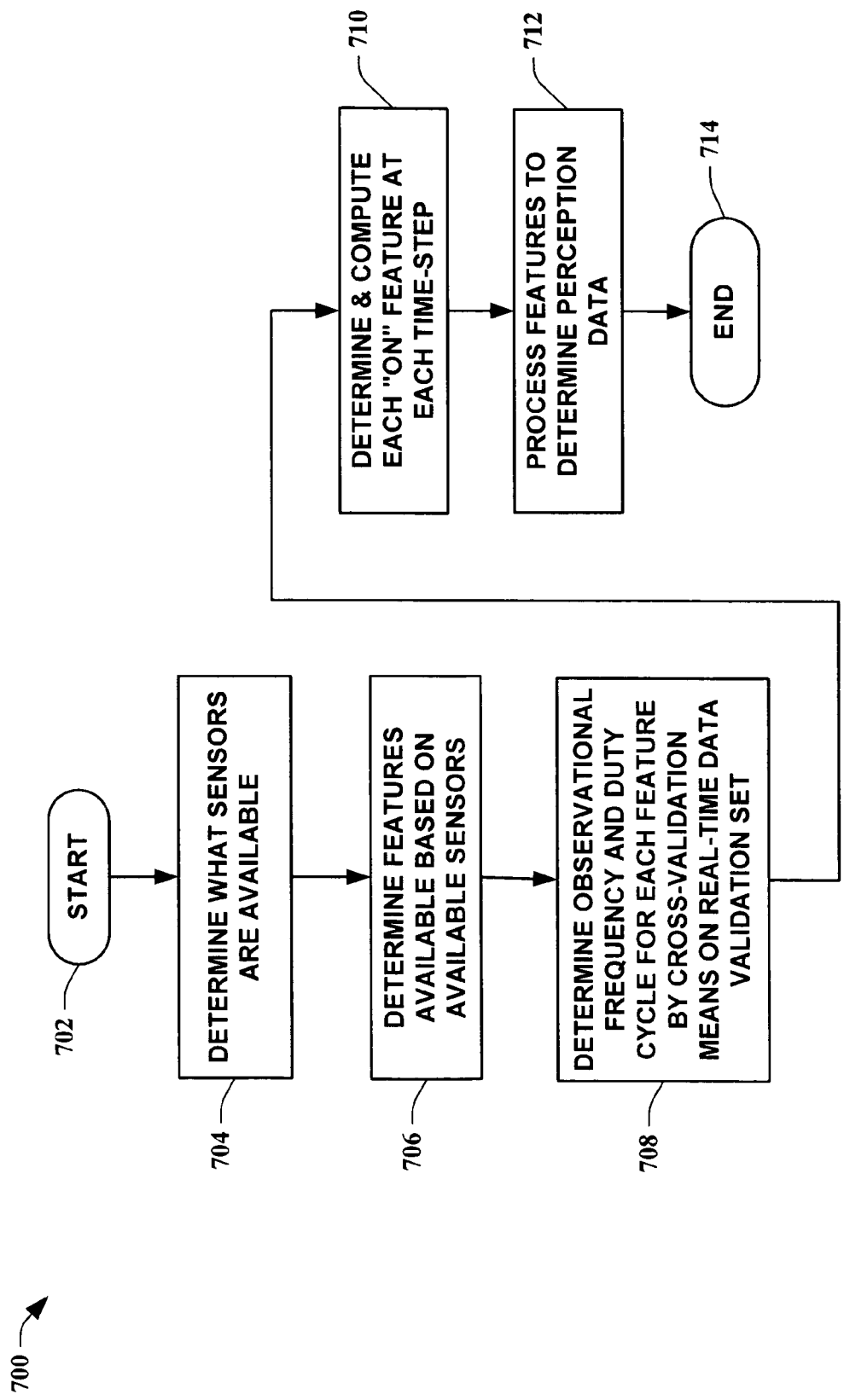
FIG. 7 is a flow diagram of a method of utilizing rate-based perception in accordance with an aspect of the present invention.

Turning to FIG. 7, a flow diagram of a method 700 of utilizing rate-based perception in accordance with an aspect of the present invention is illustrated. The method 700 starts 702 by determining what perception sensors are available for gathering perception evidence 704. Once available sensors have been established, it is determined what features are available based upon the available sensors 706. A single sensor can provide several features by itself and/or two sensors can provide a substantially similar feature, but one sensor may require less computing resources. An observational sensor frequency and sensor duty cycle are then determined by a cross-validation means on a real-time data validation set 708. This determines "when" a sensor is to turn ON and "how long" a sensor will remain "ON." In an alternative instance of the present invention, the observational sensor frequency and the sensor duty cycle can be adapted "on-the-fly" for each sensor without requiring a cross-validation means. At each time-step, a system then determines which features are ON and which ones are OFF, computing only the features that are ON 710. The features are then processed to determine perception data 712, ending the flow 714. The perception data is utilized by such entities as software applications and the like which are context-aware.

Figure 8:
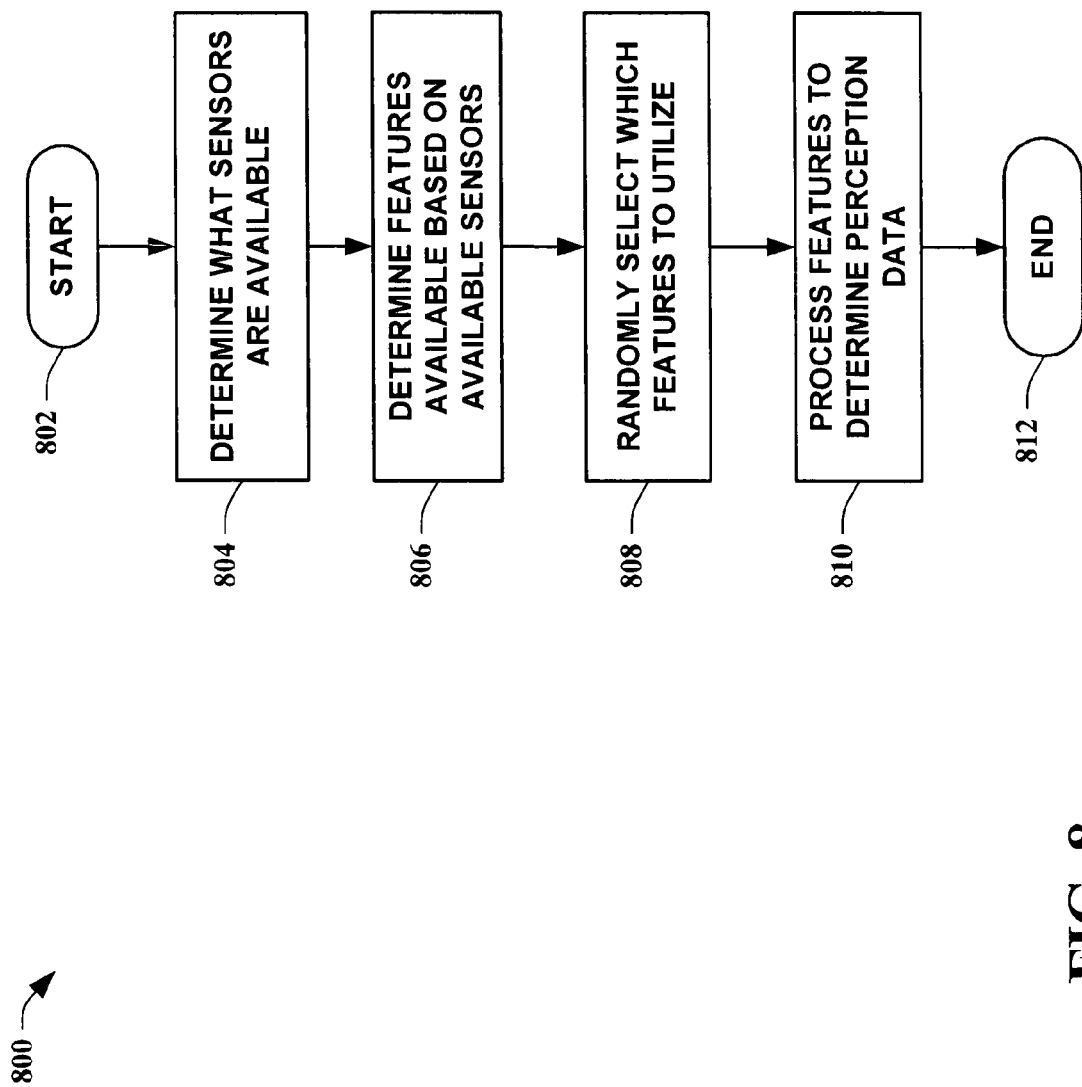
FIG. 8 is a flow diagram of a method of utilizing random selection perception in accordance with an aspect of the present invention.

Moving on to FIG. 8, a flow diagram of a method 800 of utilizing random selection perception in accordance with an aspect of the present invention is shown. The method 800 starts 802 by determining what perception sensors are available for gathering perception evidence 804. Once available sensors have been established, it is determined what features are available based upon the available sensors 806. A single sensor can provide several features by itself and/or two sensors can provide a substantially similar feature, but one sensor may require less computing resources. Features are then randomly selected for utilization in a perception system 808. Random selection produces less of a computational load on resources on average over utilizing all resources all of the time. The randomly selected features are then utilized to provide a best available determination of perception data for a perception system 810, ending the flow 812. Because of the random nature of this type of perception policy, utilization of resources is reduced, but pertinent information may not always be available at a particular desired time.

Figure 9:
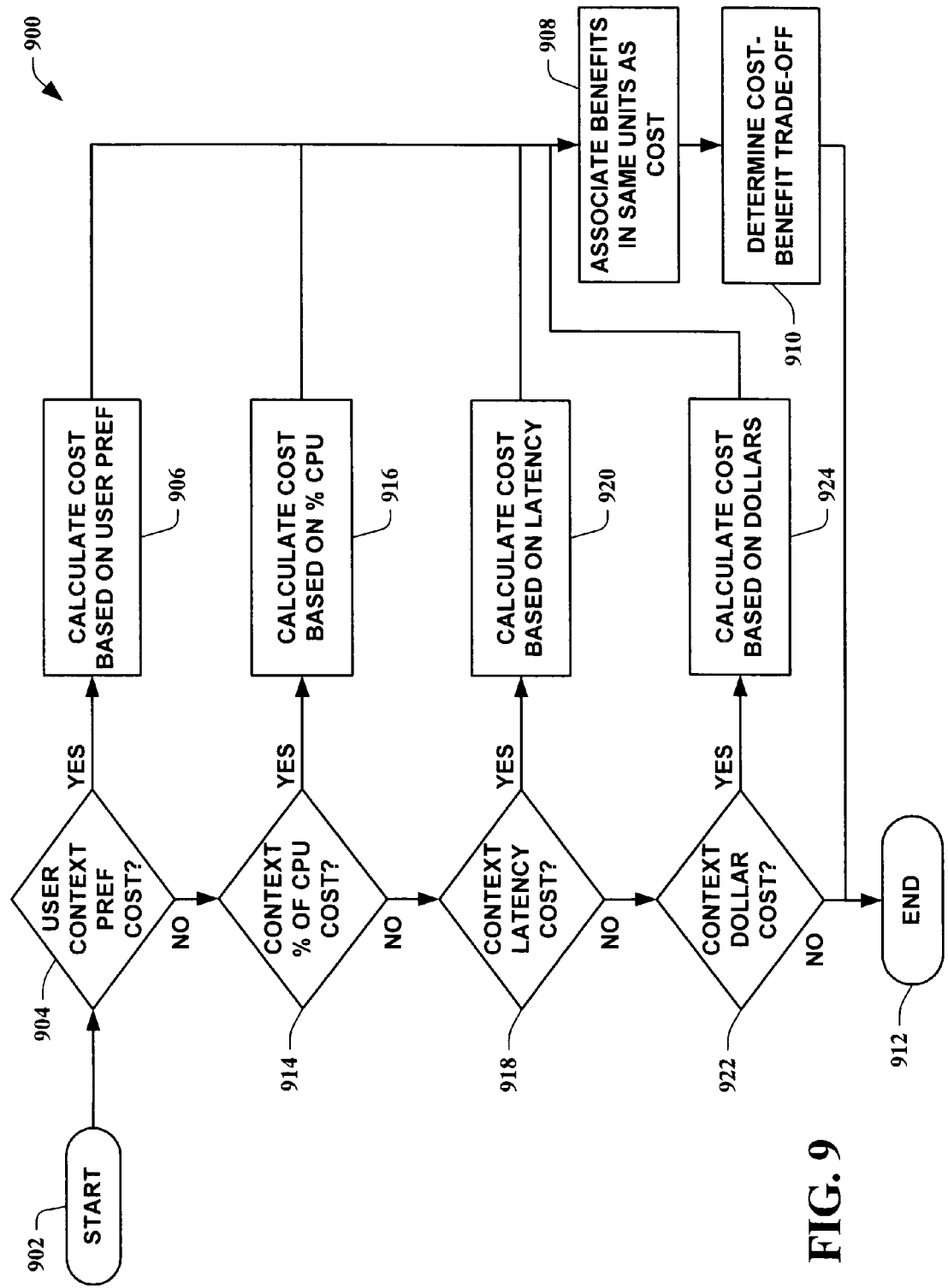
FIG. 9 is a flow diagram of a method of selecting cost-benefit value types in accordance with an aspect of the present invention.

In FIG. 9, a flow diagram of a method 900 of selecting cost-benefit value types in accordance with an aspect of the present invention is depicted. The method 900 starts 902 by determining if user context preferences for cost value type exist 904. If yes, cost is calculated based upon the user context preference for cost value type 906. Thus, if a user desires that costs, for example, be shown in microseconds of CPU time, cost is calculated utilizing these units. A benefit value is then determined utilizing the same cost value type as indicated for cost 908. A cost-benefit trade-off is then determined utilizing like units for both the cost and the benefit values 910, ending the flow 912. If, however, no user context preferences for cost value types exist 904, then a determination is made as to whether context determination is based on percentage of CPU utilization 914. If yes, cost is calculated based upon percentage of CPU utilization 916. A benefit value is then determined utilizing the same cost value type as indicated for cost 908. A cost-benefit trade-off is then determined utilizing like units for both the cost and the benefit values 910, ending the flow 912. If, however, it is not desired to utilize percentage of CPU as units for cost 914, a determination is made as to whether cost is to be based on latency 918. If yes, cost is calculated based upon latency 920. A benefit value is then determined utilizing the same cost value type as indicated for cost 908. A cost-benefit trade-off is then determined utilizing like units for both the cost and the benefit values 910, ending the flow 912. If, however, it is not desirable to utilize latency as units for cost, a determination is made as to whether a dollar value is desired for the cost unit. If no, the flow ends 912. If yes, cost is calculated based upon dollar values 924. A benefit value is then determined utilizing the same cost value type as indicated for cost 908. A cost-benefit trade-off is then determined utilizing like units for both the cost and the benefit values 910, ending the flow 912. One skilled in the art will recognize that many other value types are within the scope of the present invention.

One instance of the present invention extends the analysis by learning and harnessing inferences about the persistence versus volatility of observational states of the world. Rather than consider findings unobserved at a particular time slice if the requisite sensory analyses have not been immediately performed, the growing error for each sensor based on the previous evaluation of that sensor and the time since the finding was last observed is learned. The probability distribution over states that will be seen based on the previously observed value can be learned and then captured by functions of time. For example, the probability distribution over a finding about skin color analysis used in face detection that had been earlier directly observed in a previous time slice can be modeled by learning via training data how that value transitions into a probability distribution over values at increasing times since the observation was made. As faces do not typically disappear instantaneously, approximations can be modeled and leveraged based on previously examined states. After learning distributions that capture a probabilistic model of the dynamics of the volatility versus persistence of observations, such distributions can be substituted and integrated over, or sampled from, in lieu of assuming "not observed" at each step. Thus, such probabilistic modeling of persistence can be leveraged in the computation of the expected value of information to guide the allocation of resources in perceptual systems.

For example, the probability distribution of skin color, $P_{skin}(x)$, can be modeled with a normal or Gaussian distribution of a mean of a last observed value and of a covariance matrix that increases over time with a rate learned from data, i.e., in a one-dimensional case:

$$P_{skin}(x) = \frac{1}{(2\pi\sigma(t)^2)^{1/2}} \exp\left\{-\frac{(x-\mu)^2}{2\sigma(t)^2}\right\} \qquad \text{Eq. (7)}$$

where μ is the mean value and σ(t) is the standard deviation at time "t." In future inferences, if the EVI analysis doesn't select the skin color feature to be computed, instead of assuming that the skin color feature has not been observed, the previous distribution can be sampled to obtain its value.

Figure 10:
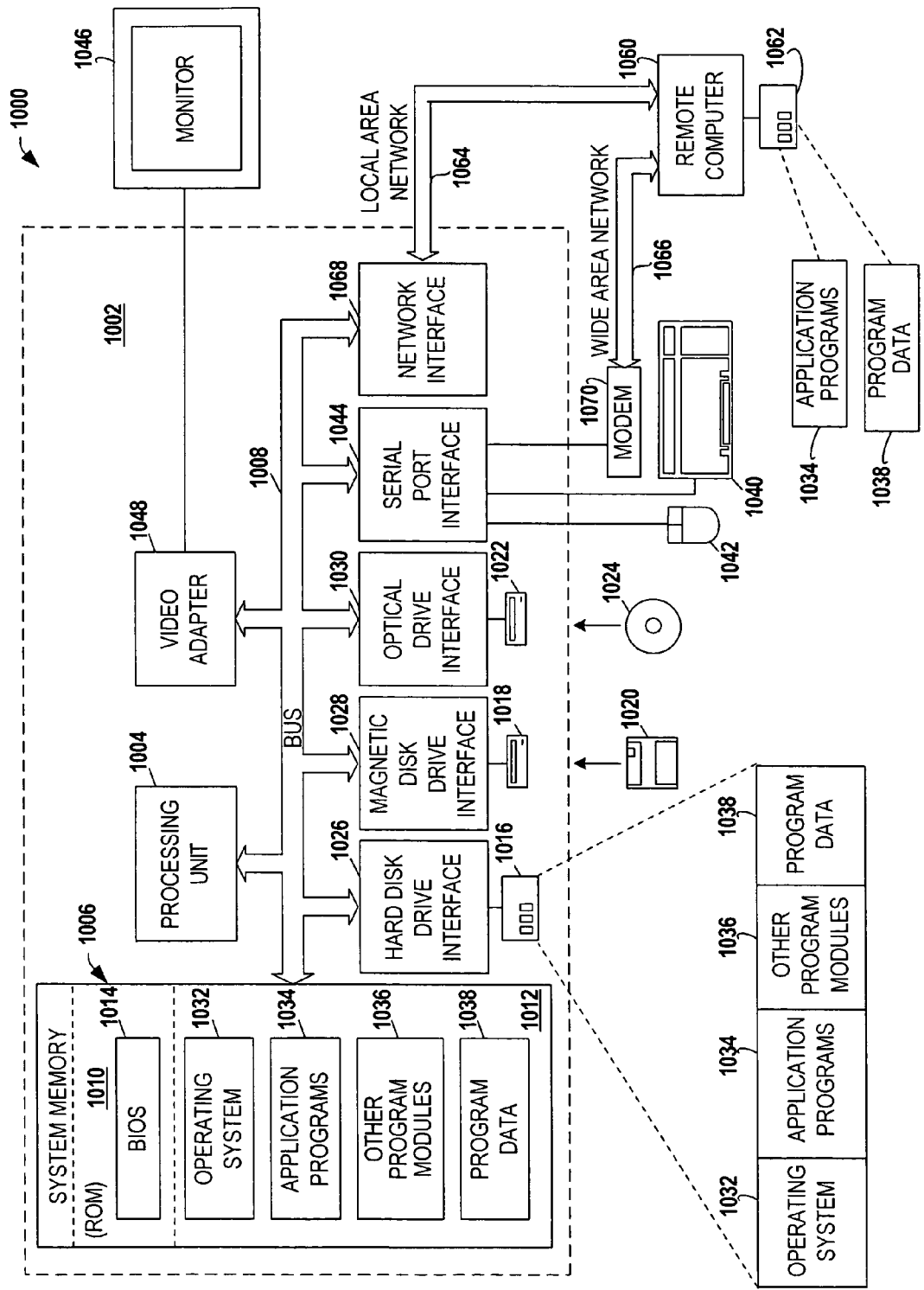
FIG. 10 illustrates an example operating environment in which the present invention can function.

In order to provide additional context for implementing various aspects of the present invention, FIG. 10 and the following discussion is intended to provide a brief, general description of a suitable computing environment 1000 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 10, an exemplary system environment 1000 for implementing the various aspects of the invention includes a conventional computer 1002, including a processing unit 1004, a system memory 1006, and a system bus 1008 that couples various system components, including the system memory, to the processing unit 1004. The processing unit 1004 may be any commercially available or proprietary processor. In addition, the processing unit may be implemented as multi-processor formed of more than one processor, such as may be connected in parallel.

The system bus 1008 may be any of several types of bus structure including a memory bus or memory controller, a peripheral bus, and a local bus using any of a variety of conventional bus architectures such as PCI, VESA, Microchannel, ISA, and EISA, to name a few. The system memory 1006 includes read only memory (ROM) 1010 and random access memory (RAM) 1012. A basic input/output system (BIOS) 1014, containing the basic routines that help to transfer information between elements within the computer 1002, such as during start-up, is stored in ROM 1010.

The computer 1002 also may include, for example, a hard disk drive 1016, a magnetic disk drive 1018, e.g., to read from or write to a removable disk 1020, and an optical disk drive 1022, e.g., for reading from or writing to a CD-ROM disk 1024 or other optical media. The hard disk drive 1016, magnetic disk drive 1018, and optical disk drive 1022 are connected to the system bus 1008 by a hard disk drive interface 1026, a magnetic disk drive interface 1028, and an optical drive interface 1030, respectively. The drives 1016-1022 and their associated computer-readable media provide nonvolatile storage of data, data structures, computer-executable instructions, etc. for the computer 1002. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1000, and further that any such media may contain computer-executable instructions for performing the methods of the present invention.

A number of program modules may be stored in the drives 1016-1022 and RAM 1012, including an operating system 1032, one or more application programs 1034, other program modules 1036, and program data 1038. The operating system 1032 may be any suitable operating system or combination of operating systems. By way of example, the application programs 1034 and program modules 1036 can include employment of perception systems that limit computational resource burdens in accordance with an aspect of the present invention.

A user can enter commands and information into the computer 1002 through one or more user input devices, such as a keyboard 1040 and a pointing device (e.g., a mouse 1042). Other input devices (not shown) may include a microphone, a joystick, a game pad, a satellite dish, wireless remote, a scanner, or the like. These and other input devices are often connected to the processing unit 1004 through a serial port interface 1044 that is coupled to the system bus 1008, but may be connected by other interfaces, such as a parallel port, a game port or a universal serial bus (USB). A monitor 1046 or other type of display device is also connected to the system bus 1008 via an interface, such as a video adapter 1048. In addition to the monitor 1046, the computer 1002 may include other peripheral output devices (not shown), such as speakers, printers, etc.

It is to be appreciated that the computer 1002 can operate in a networked environment using logical connections to one or more remote computers 1060. The remote computer 1060 may be a workstation, a server computer, a router, a peer device or other common network node, and typically includes many or all of the elements described relative to the computer 1002, although, for purposes of brevity, only a memory storage device 1062 is illustrated in FIG. 10. The logical connections depicted in FIG. 10 can include a local area network (LAN) 1064 and a wide area network (WAN) 1066. Such networking environments are commonplace in offices, enterprise-wide computer networks, intranets and the Internet.

When used in a LAN networking environment, for example, the computer 1002 is connected to the local network 1064 through a network interface or adapter 1068. When used in a WAN networking environment, the computer 1002 typically includes a modem (e.g., telephone, DSL, cable, etc.) 1070, or is connected to a communications server on the LAN, or has other means for establishing communications over the WAN 1066, such as the Internet. The modem 1070, which can be internal or external relative to the computer 1002, is connected to the system bus 1008 via the serial port interface 1044. In a networked environment, program modules (including application programs 1034) and/or program data 1038 can be stored in the remote memory storage device 1062. It will be appreciated that the network connections shown are exemplary and other means (e.g., wired or wireless) of establishing a communications link between the computers 1002 and 1060 can be used when carrying out an aspect of the present invention.

In accordance with the practices of persons skilled in the art of computer programming, the present invention has been described with reference to acts and symbolic representations of operations that are performed by a computer, such as the computer 1002 or remote computer 1060, unless otherwise indicated. Such acts and operations are sometimes referred to as being computer-executed. It will be appreciated that the acts and symbolically represented operations include the manipulation by the processing unit 1004 of electrical signals representing data bits which causes a resulting transformation or reduction of the electrical signal representation, and the maintenance of data bits at memory locations in the memory system (including the system memory 1006, hard drive 1016, floppy disks 1020, CD-ROM 1024, and remote memory 1062) to thereby reconfigure or otherwise alter the computer system's operation, as well as other processing of signals. The memory locations where such data bits are maintained are physical locations that have particular electrical, magnetic, or optical properties corresponding to the data bits.

Figure 11:
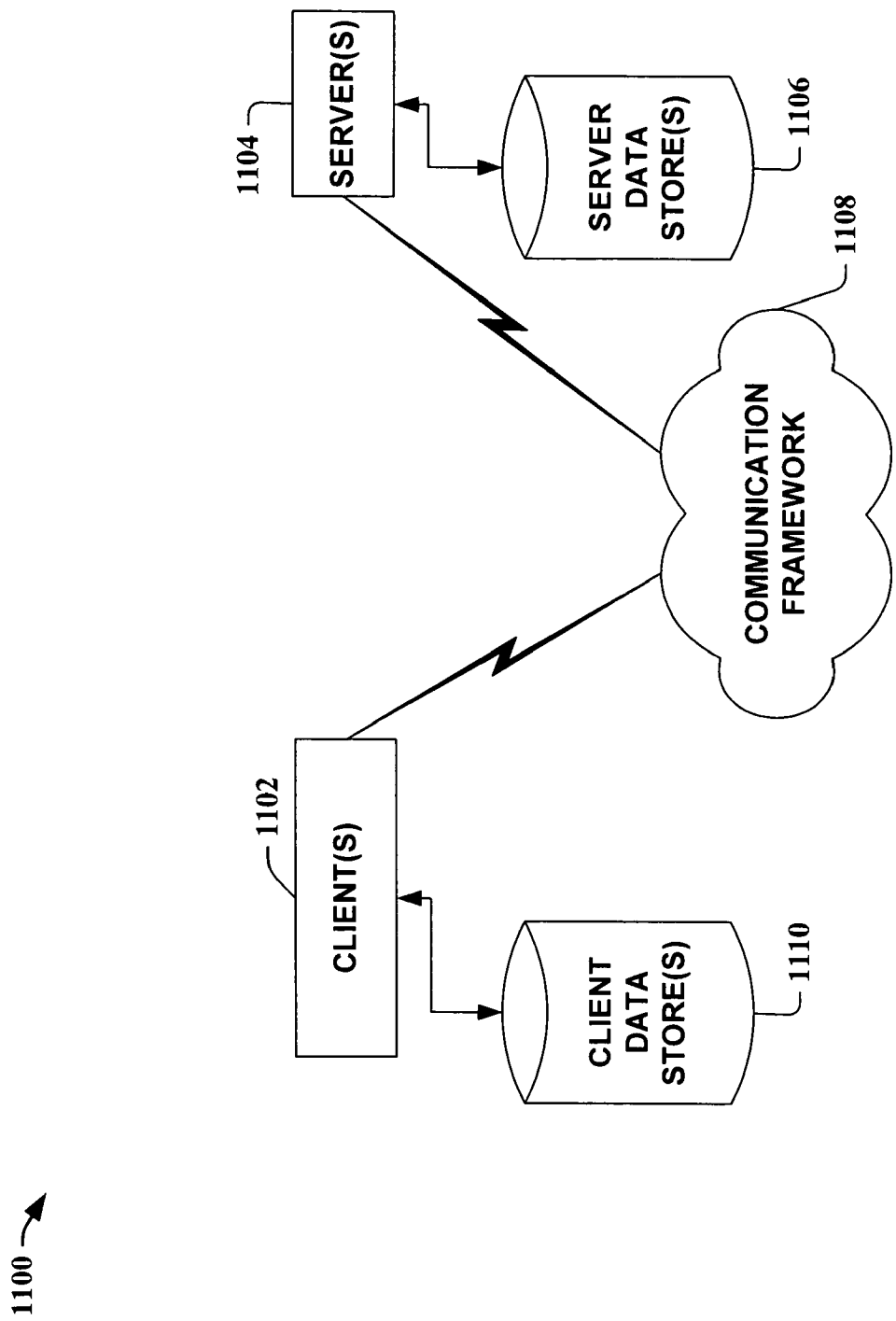
FIG. 11 illustrates another example operating environment in which the present invention can function.

FIG. 11 is another block diagram of a sample computing environment 1100 with which the present invention can interact. The system 1100 further illustrates a system that includes one or more client(s) 1102. The client(s) 1102 can be hardware and/or software (e.g., threads, processes, computing devices). The system 1100 also includes one or more server(s) 1104. The server(s) 1104 can also be hardware and/or software (e.g., threads, processes, computing devices). The servers 1104 can house threads to perform transformations by employing the present invention, for example. One possible communication between a client 1102 and a server 1104 may be in the form of a data packet adapted to be transmitted between two or more computer processes. The system 1100 includes a communication framework 1108 that can be employed to facilitate communications between the client(s) 1102 and the server(s) 1104. The client(s) 1102 are operably connected to one or more client data store(s) 1110 that can be employed to store information local to the client(s) 1102. Similarly, the server(s) 1104 are operably connected to one or more server data store(s) 1106 that can be employed to store information local to the servers 1104.

In one instance of the present invention, a data packet transmitted between two or more computer components that facilitate perception, the data packet is comprised of, at least in part, information relating to a system that determines, based, at least in part, on expected value of information, employed to facilitate utilization of computational resources.

In another instance of the present invention, a computer readable medium storing computer executable components of a system for facilitating perception is comprised of, at least in part, a system that determines, based, at least in part, on expected value of information, employed to facilitate utilization of computational resources.

In yet another instance of the present invention, a context-aware perception-based system can be utilized to determine economic value of a given context based on its overall value to a system. Thus, an industry, such as orange growing, can be valued by its context and impacts based on data gathered for a given context (e.g., growing season weather, past productivity yields).

It is to be appreciated that the systems and/or methods of the present invention can be utilized in perception systems facilitating computer components and non-computer related components alike. Further, those skilled in the art will recognize that the systems and/or methods of the present invention are employable in a vast array of electronic related technologies, including, but not limited to, computers, servers and/or handheld electronic devices and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An analysis system, comprising:
   a plurality of sensors configured to collect perception evidence;
   a computer system comprising a perception system that, when executed, consumes computing resources of the computing system, the perception system comprising:
      a control component that selectively gathers from the plurality of sensors the perception evidence, the perception evidence being gathered at times selected to limit utilization of the computing resources of the computer system by the perception system; and
      an analysis component that utilizes an analysis policy to analyze the perception evidence to determine a context of a user of the computer system,
   wherein:
      the control component uses information from the analysis component regarding at least one feature about which to collect data to select the times at which to gather perception evidence from one or more of the plurality of sensors;
      the analysis component generates the information based on a value of the at least one feature for determining the context;
      the analysis policy comprises at least one selected from the group consisting of: a random selection perception policy that randomly selects which features to utilize on a frame by frame basis, a rate-based perception policy that defines observational frequencies and duty cycles for at least one feature or an EVI-based perception policy that determines an expected value of information via a cost-benefit analysis means utilizing at least expected values and cost of analysis values for at least one feature, the cost of analysis values comprising at least one value proportional to an impact to the computing resources employed by the perception system.

2. The system of claim 1, the analysis component employing, at least in part, learned inferences relating to persistence versus volatility of observational states to account for unobserved data.

3. The system of claim 2, the learned inferences based, at least in part, on a probability distribution over future states based on at least one previously observed value that is captured by at least one function of time.

4. The system of claim 3, the probability distribution comprising a Gaussian distribution:

$$P(x) = \frac{1}{(2\pi\sigma(t)^2)^{1/2}} \exp\left\{-\frac{(x-\mu)^2}{2\sigma(t)^2}\right\}$$

where $\mu$ is a mean value and $\sigma(t)$ is a standard deviation at time "t."

5. The system of claim 1, the control component employing a criticality level of at least one user task to limit utilization of computing resources by the perception system.

6. The system of claim 1, the control component limiting utilization of computing resources based upon context.

7. The system of claim 1, the control component limiting utilization of computing resources by controlling what analysis policy is employed.

8. The system of claim 7, the selection of the analysis policy based on context information.

9. The system of claim 1, further comprising at least one perception sensor to provide the perception evidence for the perception system.

10. The system of claim 9, the control component limiting utilization of computing resources by facilitating control of at least one selected from the group consisting of an analysis process for at least one perception sensor and a focus of attention of at least one perception sensor.

11. The system of claim 9, the control component limiting utilization of computing resources by controlling what perception sensors are employed.

12. The system of claim 9, the perception sensor comprising at least one selected from the group consisting of a video camera, an audio microphone, a keyboard keystroke sensor, a mouse utilization sensor, and a motion detector.

13. The system of claim 9, the perception sensor comprising a detector for at least one state of at least one selected from the group consisting of at least one data structure within a computing system and at least one application activity within a computing system.

14. The system of claim 1, further comprising a user interface component that interfaces with at least one user to relay information relating to user perception preferences to the perception system.

15. The system of claim 14, the control component employing at least one user perception preference to limit utilization of computing resources by the perception system.

16. The system of claim 14, the user perception preferences comprising values of cost for utilizing computing resources.

17. The system of claim 1, the perception evidence analysis operations comprising analysis policy selection control operations between the control component and the analysis component.

18. The system of claim 1, the perception evidence analysis operations comprising perception evidence related information exchanges between the control component and the analysis component.

19. The analysis system of claim 1 utilized to design an analysis policy of at least one perception system and its perception sensors.

20. The analysis system of claim 1 utilized to determine at least one value of adding at least one sensor to at least one perception system.

21. The analysis system of claim 1 utilized to provide information relating to volatility of data due to influences of a flow of time.

22. The analysis system of claim 1 utilized to determine at least one time-based economic value of a business given its environmental context.

23. The system of claim 1, the analysis policy comprising a context-based analysis policy.

24. The system of claim 1, the analysis policy comprising a random selection perception policy that randomly selects which features to utilize on a frame by frame basis.

25. The system of claim 1, the analysis policy comprising a rate-based perception policy that defines observational frequencies and duty cycles for at least one feature.

26. The system of claim 25, the rate-based perception policy utilizing off-time that is determined by cross-validation means on a real-time data validation set to determine time for computations.

27. The system of claim 1, the analysis policy comprising an EVI-based perception policy that determines an expected value of information via a cost-benefit analysis means utilizing at least expected values and cost of analysis values for at least one feature.

28. The system of claim 27, the cost of analysis values comprising at least one value proportional to an impact to the computing resources employed by the perception system.

29. The system of claim 27, the EVI-based perception policy employing a context-based cost model to determine the cost of analysis values.

30. The system of claim 27, the EVI-based perception policy employing real-time computations of expected value of information.

31. The system of claim 30, the real-time computations processed utilizing a myopic, single step approach for computing a next best set of observations.

32. The system of claim 27, the cost of analysis values comprising at least one selected from the group consisting of dollar values, percentage of CPU utilization values, latency values, and user selected preference values.

33. The system of claim 27, the cost-benefit analysis means utilizing substantially similar value types for a cost value and a benefit value to calculate the expected value of information.

34. The system of claim 27, the cost-benefit analysis means further comprising at least one utility model that facilitates in analyzing a benefit of determining a value of at least one feature.

35. The system of claim 34, the utility model comprising a conditional utility model that alters functionality dependent upon context.

36. The system of claim 27, the EVI-based perception policy further comprising a probabilistic model.

37. The system of claim 36, the probabilistic model comprising a Hidden Markov Model (HMM) model.

38. The system of claim 37, the expected value of information determined, at least in part, via Equation (4):

$$EVI(f_k) \propto \int \sum_n [\sum_s \alpha_t^n(s) \sum_l a_{sl}^n b_l^n(O_{t+1}^{f_k})] P(M_n) \quad \text{Eq. (4)}$$
$$\max_i \sum_j U(M_i, M_j) p(M_j) d_{O_{t+1}^{f_k}} -$$
$$\max_i \sum_j U(M_i, M_j) p(M_j) - cost(O_{t+1}^{f_k})$$

where $EVI(f_k)$ is the expected value of information for perceptual feature combination $f_k$, $\alpha_t^n(s)$ is an alpha or forward variable at time t and state s in a standard Baum-Welch algorithm, $a_{sl}^n$ is a transition probability of going from state s to state l, and $b_l^n(O_{t+1}^{f_k})$ is a probability of observing $O_{t+1}^{f_k}$ in state l, all of them in model $M_n$, $U(M_i, M_j)$ is a utility of assessing a value of asserting that real-world state $M_i$ is $M_j$, and $f_k^m$, m=1 . . . M to denote all possible values of a feature combination $f_k$, and $cost(O_{t+1}^{f_k})$ is a computational cost associated with computing observations $O_{t+1}^{f_k}$.

39. The system of claim 37, the expected value of information determined, at least in part, via discretized Equation (5):

$$EVI \propto \sum_m \sum_n [\sum_s \alpha_t^n(s) \sum_l a_{sl}^n b_l^n(O_{t+1}^{f_k^m})] P(M_n) \quad \text{Eq. (5)}$$
$$\max_i \sum_j U(M_i, M_j) p(M_j) - \max_i \sum_j U(M_i, M_j) p(M_j) -$$
$$cost(O_{t+1}^{f_k})$$

where EVI is the expected value of information, $\alpha_t^n(s)$ is an alpha or forward variable at time t and state s in a standard Baum-Welch algorithm, $a_{sl}^n$ is a transition probability of going from state s to state l, and $b_l^n(O_{t+1}^{f_k^m})$ is a probability of observing $O_{t+1}^{f_k^m}$ in state l, all of them in model $M_n$, $U(M_i, M_j)$ is a utility of assessing a value of asserting that real-world state $M_i$ is $M_j$, and $f_k^m$, m=1 . . . M to denote discretized values of a feature combination $f_k$, and $cost(O_{t+1}^{f_k^m})$ is a computational cost associated with computing observations $O_{t+1}^{f_k^m}$.

40. The system of claim 36, the probabilistic model comprising a Layered Hidden Markov Model (LHMM) model.

41. The system of claim 40, the Layered Hidden Markov Model (LHMM) utilized to substantially reduce re-training of higher level layers when an operating environment change occurs.

42. A non-transitory computer readable medium having stored thereon computer executable components of the system of claim 1.

43. An analysis system comprising at least one processor, the analysis system comprising
   a control component that selectively gathers perception evidence to limit utilization of computing resources by a perception system; and
   an analysis component that utilizes an analysis policy to analyze, with the at least one processor, the perception evidence obtained for employment in the perception system; wherein
   the analysis component is interactive with the control component for perception evidence analysis operations,
   the analysis policy comprises an EVI-based perception policy that determines an expected value of information via a cost-benefit analysis means utilizing at least expected values and cost of analysis values for at least one feature,
   the cost-benefit analysis means comprise at least one utility model that facilitates in analyzing a benefit of determining a value of the at least one feature,
   the utility model comprises a conditional utility model that alters functionality dependent upon context, and
   the expected value of information is determined, at least in part, via utilization of Equation (2):

$$EVI(f_k) = EV(f_k) - \max_i \sum_j P(M_j | E) U(M_i, M_j) - cost(f_k) \quad \text{Eq. (2)}$$

where EVI($f_k$) is the expected value of information for perceptual feature combination $f_k$, EV($f_k$) is an expected value of $f_k$ based on observed evidence, E represents previous observational evidence, U($M_i$, $M_j$) is a utility of assessing a value of asserting that real-world state $M_i$ is $M_j$, and cost($f_k$) is a computational cost associated with computing feature combination $f_k$.

44. A method of analyzing data, comprising:
with the at least one processor:
obtaining perception evidence for a perception system from a plurality of sensors;
determining a context from the perception evidence;
analyzing the perception evidence utilizing an analysis policy to determine a perceived system value indicating a value of utilization of computing resources of a computer system by the perception system; and
employing the perceived system value to limit utilization of the computing resources by determining at least one sensor from the plurality of sensors to obtain the perception evidence and a time at which to obtain the perception evidence by the at least one sensor, wherein the time is selected based on an intensity of interaction of a user with the computer system.

45. The method of claim 44, wherein analyzing the perception evidence further comprises:
employing, at least in part, learned inferences relating to persistence versus volatility of observational states to provide unobserved perception evidence in lieu of observed perception evidence.

46. The method of claim 45, wherein the learned inferences are based, at least in part, on a probability distribution model for future states based on at least one previously observed value that is captured by at least one function of time.

47. The method of claim 46, wherein the probability distribution model comprises, at least in part, a Gaussian distribution:

$$P(x) = \frac{1}{(2\pi\sigma(t)^2)^{1/2}} \exp\left\{-\frac{(x-\mu)^2}{2\sigma(t)^2}\right\}$$

where $\mu$ is a mean value and $\sigma(t)$ is a standard deviation at time "t."

48. The method of claim 44, further comprising:
accepting user input to obtain user preferences to establish criteria for limiting utilization of the computing resources by the perception system.

49. The method of claim 48, wherein the criteria comprises at least one critical task that supersedes analysis of the perception evidence for the at least one feature in the context.

50. The method of claim 44, further comprising:
extracting the perception evidence pertaining to at least one feature from the at least one sensor.

51. The method of claim 50, further comprising:
selecting when the at least one sensor is employed to obtain the perception evidence to further optimize the limiting of the computing resources employed by the perception system.

52. The method of claim 50, wherein the at least one sensor obtains perception evidence for at least one feature.

53. The method of claim 44, further comprising:
selecting the analysis policy based on optimization of limiting the computing resources for the context.

54. The method of claim 44, further comprising:
selecting the analysis policy based on optimization of limiting the computing resources for obtaining a desired feature.

55. The method of claim 44, wherein employing the perceived system value comprises utilizing the computing resources when the perceived system value is above a threshold.

56. The method of claim 55, the threshold is a predetermined threshold.

57. The method of claim 56, the predetermined threshold is set via a user preference.

58. The method of claim 56, the predetermined threshold is set via the perception system based on context.

59. The method of claim 44, wherein employing the perceived system value comprises utilizing the computing resources for a feature combination that yields a maximal perceived system value.

60. The method of claim 44, the analysis policy comprising a rate-based perception policy.

61. The method of claim 60, further comprising:
defining observational frequencies and duty cycles via a cross-validation means on a real-time data validation set for perception sensors employed by the perception system; and
determining which perception sensors are providing sensed data and utilizing the sensed data to compute features facilitated by the sensed data.

62. The method of claim 61, further comprising:
adapting the observational frequencies and duty cycles for at least one sensor dynamically.

63. The method of claim 44, the analysis policy comprising a random selection-based perception policy.

64. The method of claim 63, further comprising:
determining features available based on available perception sensors employed by the perception system;
randomly selecting which features to analyze; and
processing at least one analyzed feature to determine output perception data.

65. The method of claim 44, the analysis policy comprising an EVI-based perception policy.

66. The method of claim 65, further comprising:
calculating a benefit value for determining a feature;
calculating a cost value for determining the feature; and
utilizing the EVI-based perception policy to derive a cost-benefit analysis value of the feature; the cost benefit analysis utilizing a benefit value and a cost value.

67. The method of claim 66, the benefit value and the cost value calculated employing a substantially similar value type.

68. The method of claim 67, the value type comprising at least one selected from the group consisting of a dollar value, a percentage of CPU utilization value, a latency value, and a user-selected value.

69. The method of claim 65, the EVI-based perception policy further comprising at least one selected from the group consisting of a utility model and a probabilistic model.

70. The method of claim 69, further comprising:
evaluating an expected value of information (EVI) utilizing, at least in part, employment of Equation (2):

$$EVI(f_k) = EV(f_k) - \max_i \sum_j P(M_j | E)U(M_i, M_j) - cost(f_k) \quad \text{Eq. (2)}$$

where $EVI(f_k)$ is the expected value of information for perceptual feature combination $f_k$, $EV(f_k)$ is an expected value of $f_k$, based on observed evidence, E represents previous observational evidence, $U(M_i, M_j)$ is a utility of assessing a value of asserting that real-world state $M_i$ is $M_j$, and $cost(f_k)$ is a computational cost associated with computing feature combination $f_k$.

71. The method of claim 69, the probabilistic model comprising a Hidden Markov Model (HMM).

72. The method of claim 71, further comprising:
evaluating an expected value of information (EVI) utilizing, at least in part, employment of Equation (4):

$$EVI(f_k) \propto \int \sum_n \sum_s \left[ \sum_s \alpha_t^n(s) \sum_l a_{sl}^n b_l^n (O_{t+1}^{f_k}) \right] P(M_n)$$
$$\max_i \sum_j U(M_i, M_j) p(M_j) d_{O_{t+1}^{f_k}} -$$
$$\max_i \sum_j U(M_i, M_j) p(M_j) - cost(O_{t+1}^{f_k}) \quad \text{Eq. (4)}$$

where $EVI(f_k)$ is the expected value of information for perceptual feature combination $f_k$, $\alpha_t^n(s)$ is an alpha or forward variable at time t and state s in a standard Baum-Welch algorithm, $a_{sl}^n$ is a transition probability of going from state s to state l, and $b_l^n(O_{t+1}^{f^m})$ is a probability of observing $O_{t+1}^{f^m}$ in state l, all of them in model $M_n$, $U(M_i, M_j)$ is a utility of assessing a value of asserting that real-world state $M_i$ is $M_j$, and $f_k^m$, m=1 ... M to denote all possible values of a feature combination $f_k$, and $cost(O_{t+1}^{f^m})$ is a computational cost associated with computing observations $O_{t+1}^{f^m}$.

73. The method of claim 71, further comprising:
evaluating an expected value of information (EVI) utilizing, at least in part, employment of discretized Equation (5):

$$EVI \propto \sum_m \sum_n \left[ \sum_s \alpha_t^n(s) \sum_t a_{sl}^n b_l^n (O_{t+1}^{f^m}) \right] P(M_n)$$
$$\max_i \sum_j U(M_i, M_j) p(M_j) -$$
$$\max_i \sum_j U(M_i, M_j) p(M_j) - cost(O_{t+1}^{f_k}) \quad \text{Eq. (5)}$$

where EVI is the expected value of information, $\alpha_t^n(s)$ is an alpha or forward variable at time t and state s in a standard Baum-Welch algorithm, $a_{sl}^n$ is a transition probability of going from state s to state l, and $b_l^n(O_{t+1}^{f^m})$ is a probability of observing $O_{t+1}^{f^m}$ in state l, all of them in model $M_n$, $U(M_i, M_j)$ is a utility of assessing a value of asserting that real-world state $M_i$ is $M_j$, and $f_k^m$, m=1 ... M to denote discretized values of a feature combination $f_k$, and $cost(O_{t+1}^{f^m})$ is a computational cost associated with computing observations $O_{t+1}^{f^m}$.

74. The method of claim 69, the probabilistic model comprising a Layered Hidden Markov Model (LHMM).

75. The method of claim 74, further comprising:
employing lower level layers of the LHMM to mask higher level layers from needing to be re-trained when the perception system is changed to a new environment.

76. A perception evaluation system utilizing the method of claim 44 to determine benefits of additional perception sensors to a perception system.

77. A perception design system utilizing the method of claim 44 to design a perception system to optimally limit utilization of computing resources.

78. A perception response system employing the method of claim 44 to provide information utilizing knowledge of volatility of data due to influences of a flow of time to re-determine perceptions at appropriate intervals.

79. A device employing the method of claim 44 comprising at least one selected from the group consisting of a computer, a server, and a handheld electronic device.

80. A device employing the system of claim 1 comprising at least one selected from the group consisting of a computer, a server, and a handheld electronic device.

81. A data analysis system, comprising:
a plurality of sensors to collect a plurality of features as perception evidence;
control means to limit utilization of computing resources of a computer system by a perception system by controlling the plurality of sensors to selectively gather the perception evidence obtained via the perception system; and
analyzing means to:
analyze the perception evidence utilizing an analysis policy to determine context of use of the computer system by one or more users in which the perception system is operating, and
guide the control means to limit the utilization of the computing resources by determining which features from the plurality of features to collect as the perception evidence depending on a value of the features for limiting the utilization of the computing resources by the perception system, based on the determined context; wherein
the control means selects at least one sensor from the plurality of sensors to collect the features.

82. A data analysis system, comprising:
a first component of a perception system that receives a data query relating to data to determine a context in which the perception system is operating so that to limit utilization of computing resources of a computer system by the perception system, wherein the data comprises perception evidence pertaining to at least one feature collected by a plurality of sensors; and
a second component that:
analyzes, with the at least one processor, volatility versus persistence of observations of at least one state of the data over time to establish reasonableness in timing of at least one reply to the query, and
selects at least one sensor from the plurality of sensors to collect the perception evidence pertaining to the at least one feature to limit the utilization of the computing resources based on a value of the at least one feature in the context, wherein
selection of the at least one feature depends on an intensity of interaction of a user with the computer system.

* * * * *

UNITED STATES PATENT AND TRADEMARK OFFICE
CERTIFICATE OF CORRECTION

| | | |
|---|---|---|
| PATENT NO. | : 7,873,724 B2 | Page 1 of 1 |
| APPLICATION NO. | : 10/729464 | |
| DATED | : January 18, 2011 | |
| INVENTOR(S) | : Eric J. Horvitz et al. | |

It is certified that error appears in the above-identified patent and that said Letters Patent is hereby corrected as shown below:

In column 29, line 9, in claim 70, delete "fk," and insert -- fk --, therefor.

Signed and Sealed this
Twelfth Day of July, 2011

David J. Kappos
*Director of the United States Patent and Trademark Office*